(12) United States Patent
Xie et al.

(10) Patent No.: US 6,845,191 B1
(45) Date of Patent: Jan. 18, 2005

(54) OPTICAL FILTER FOR WAVELENGTH DIVISION MULTIPLED OPTICAL SIGNALS

(75) Inventors: Ping Xie, San Jose, CA (US); Simon Yuanxiang Wu, San Jose, CA (US); Yalan Mao, Cupertino, CA (US); Wei Wang, San Jose, CA (US); R. Brad Bettman, Mountain View, CA (US); Nadim Maluf, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/661,991

(22) Filed: Sep. 11, 2003

Related U.S. Application Data

(60) Division of application No. 09/944,037, filed on Aug. 31, 2001, now Pat. No. 6,684,002, which is a continuation-in-part of application No. 09/879,026, filed on Jun. 11, 2001, now Pat. No. 6,694,066.
(60) Provisional application No. 60/303,705, filed on Jul. 5, 2001, and provisional application No. 60/269,190, filed on Feb. 14, 2001.

(51) Int. Cl.⁷ .................................................. G02B 6/27
(52) U.S. Cl. .............................. 385/27; 385/28; 385/29
(58) Field of Search .......................... 385/27–29, 14–16, 385/20–24, 31, 39, 42; 359/113–114

(56) References Cited

U.S. PATENT DOCUMENTS

| | | |
|---|---|---|
| 4,094,581 A | 6/1978 | Baldwin et al. ............ 350/150 |
| 4,685,773 A | 8/1987 | Carlsen et al. .............. 350/401 |
| 4,813,761 A | 3/1989 | Davis et al. ........... 350/162.15 |
| 4,987,567 A | 1/1991 | Buhrer .......................... 370/3 |
| 5,596,661 A | 1/1997 | Henry et al. .................. 385/24 |
| 5,606,439 A | 2/1997 | Wu ............................. 349/117 |
| 5,694,205 A | 12/1997 | Gualtieri et al. .............. 356/33 |
| 5,694,233 A | 12/1997 | Wu et al. .................... 359/117 |
| 5,724,165 A | 3/1998 | Wu ............................ 359/117 |
| 5,867,291 A | 2/1999 | Wu et al. ................... 359/124 |
| 6,005,697 A | 12/1999 | Wu et al. ................... 359/117 |
| 6,097,518 A | 8/2000 | Wu et al. ................... 359/128 |
| 6,208,444 B1 | 3/2001 | Wong et al. ................ 359/127 |
| 6,215,923 B1 | 4/2001 | Li ............................... 385/24 |

*Primary Examiner*—Mohammad Sikder
(74) *Attorney, Agent, or Firm*—Workman Nydegger

(57) ABSTRACT

Methods for combining or splitting optical signals that include an odd channel set an even channel set. The methods of combining or splitting are performed by subjecting the odd and even channel sets to a first filter that applies phase retardations corresponding with odd integer multiples of half a wavelength for each center wavelength associated with a selected one of the odd and even set of channels and with integer multiples of a full wavelength of each center wavelength associated with a remaining one of the odd set and the even set. The channel sets are then subjected to a second filter that applies phase retardations that are complementary to those experienced by the odd and even set of channels in the first filter. This complementary filtration has the effect of reducing dispersion. These methods may be used in optical devices applicable to a range of telecommunications applications, including optical multiplexers/demultiplexers and optical routers.

20 Claims, 20 Drawing Sheets

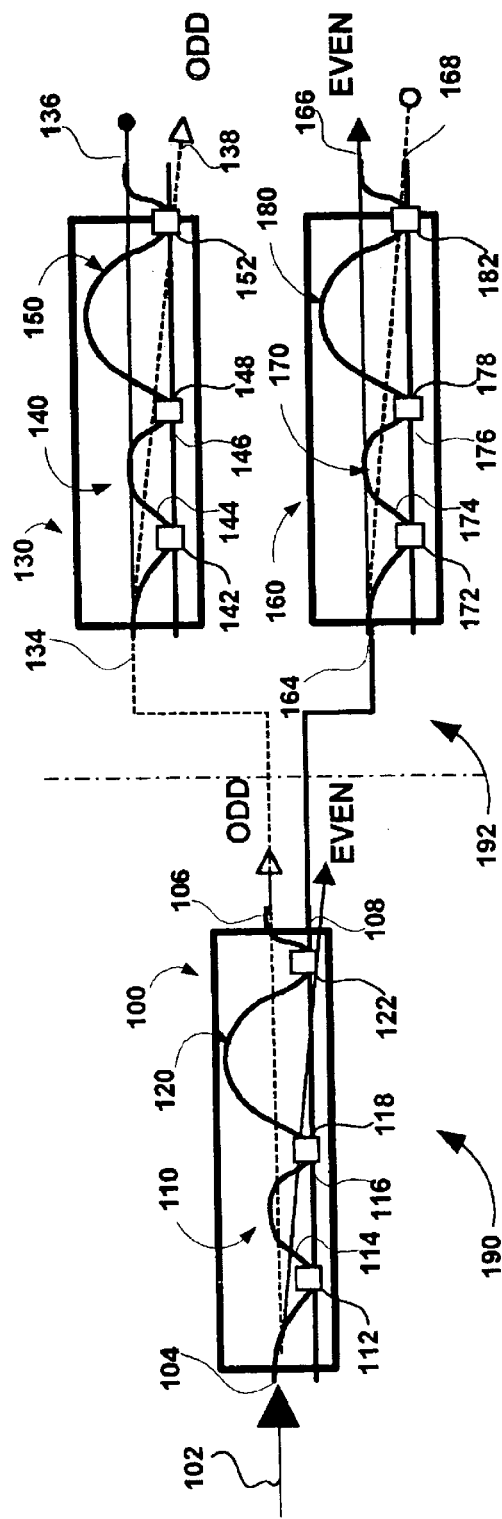
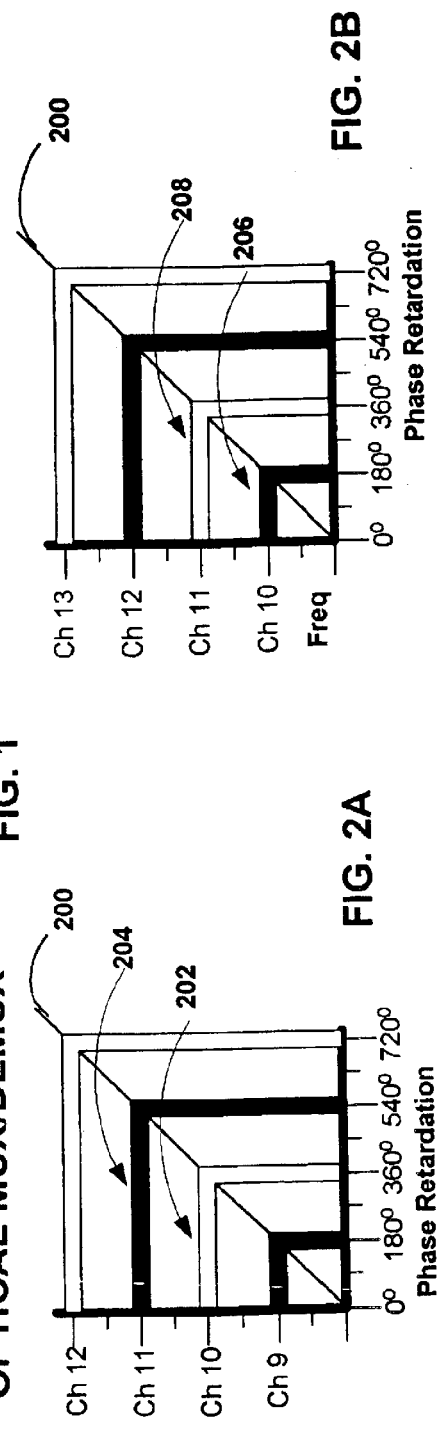
FIG. 1
FIG. 2A
FIG. 2B
OPTICAL MUX/DEMUX

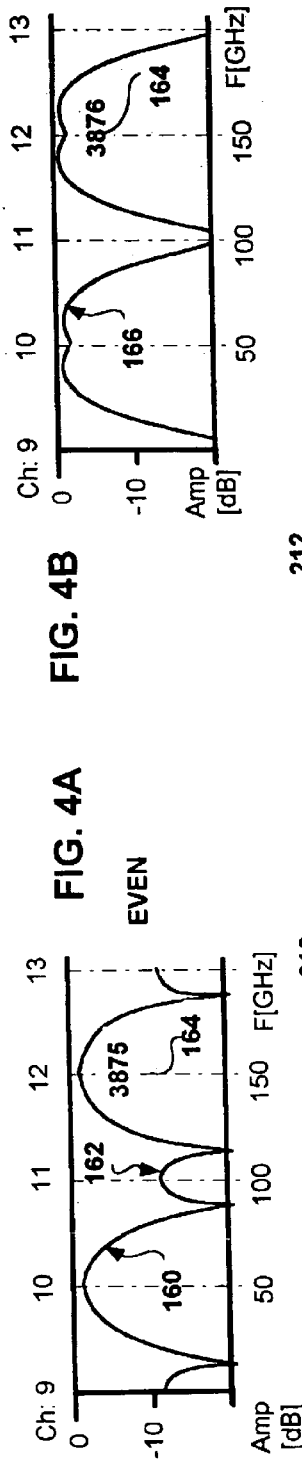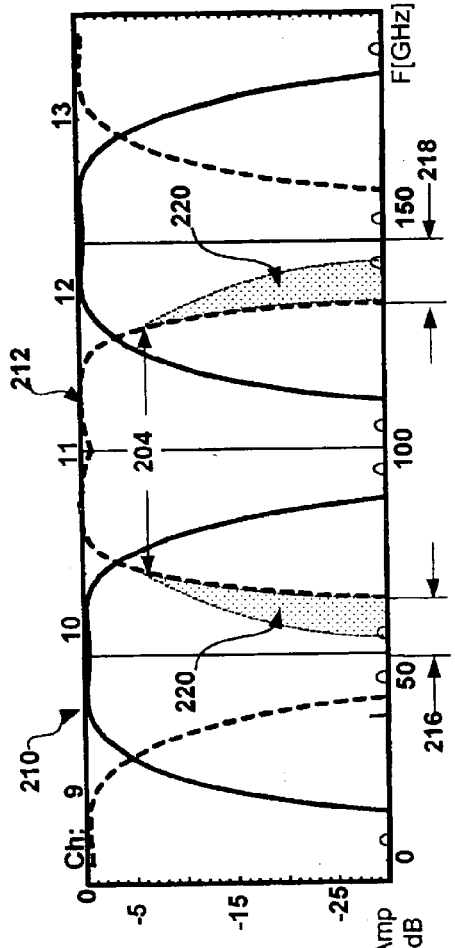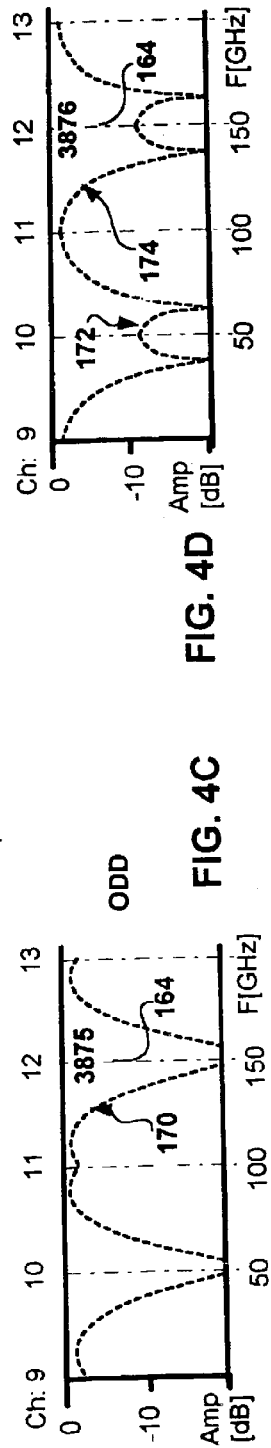

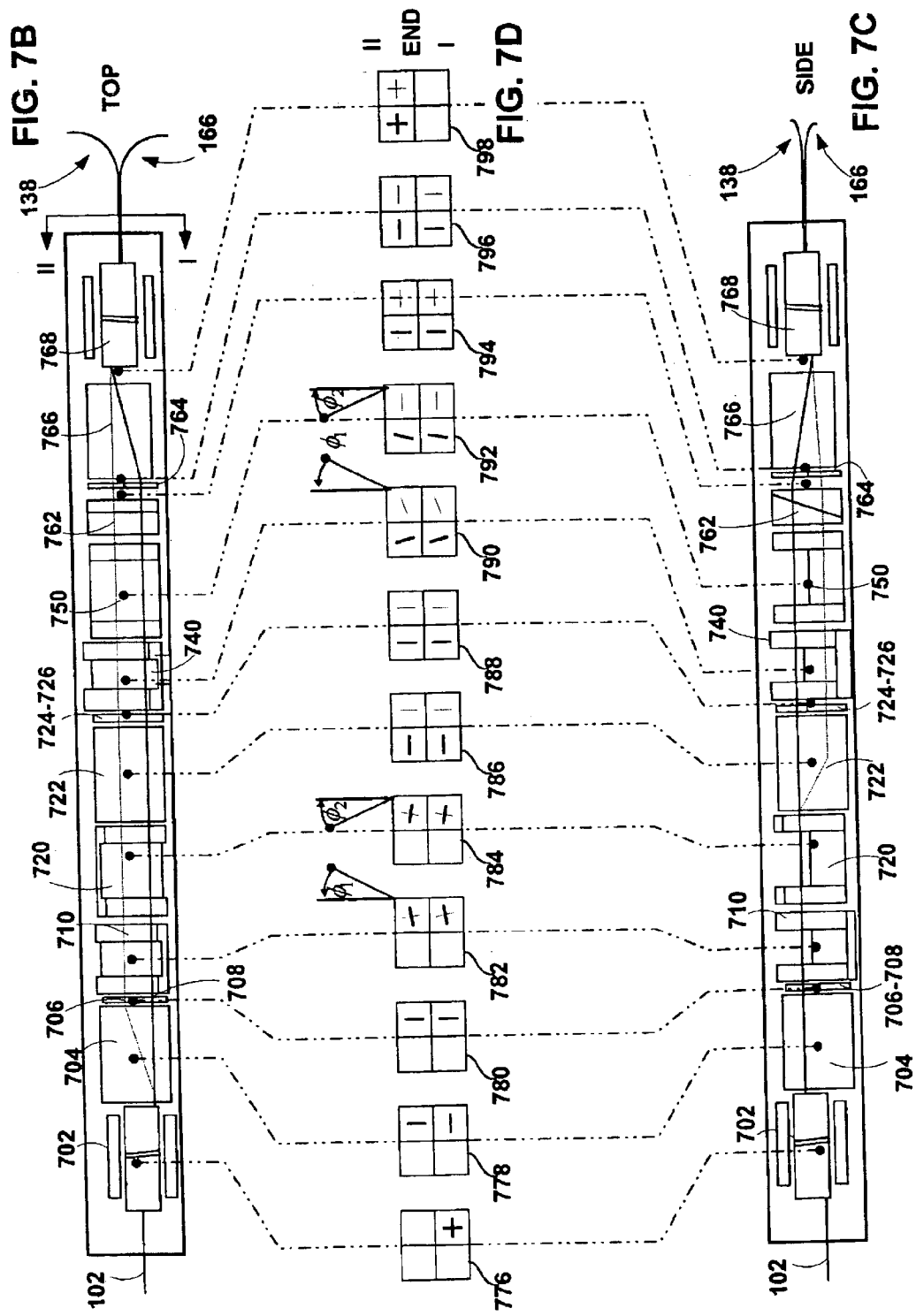

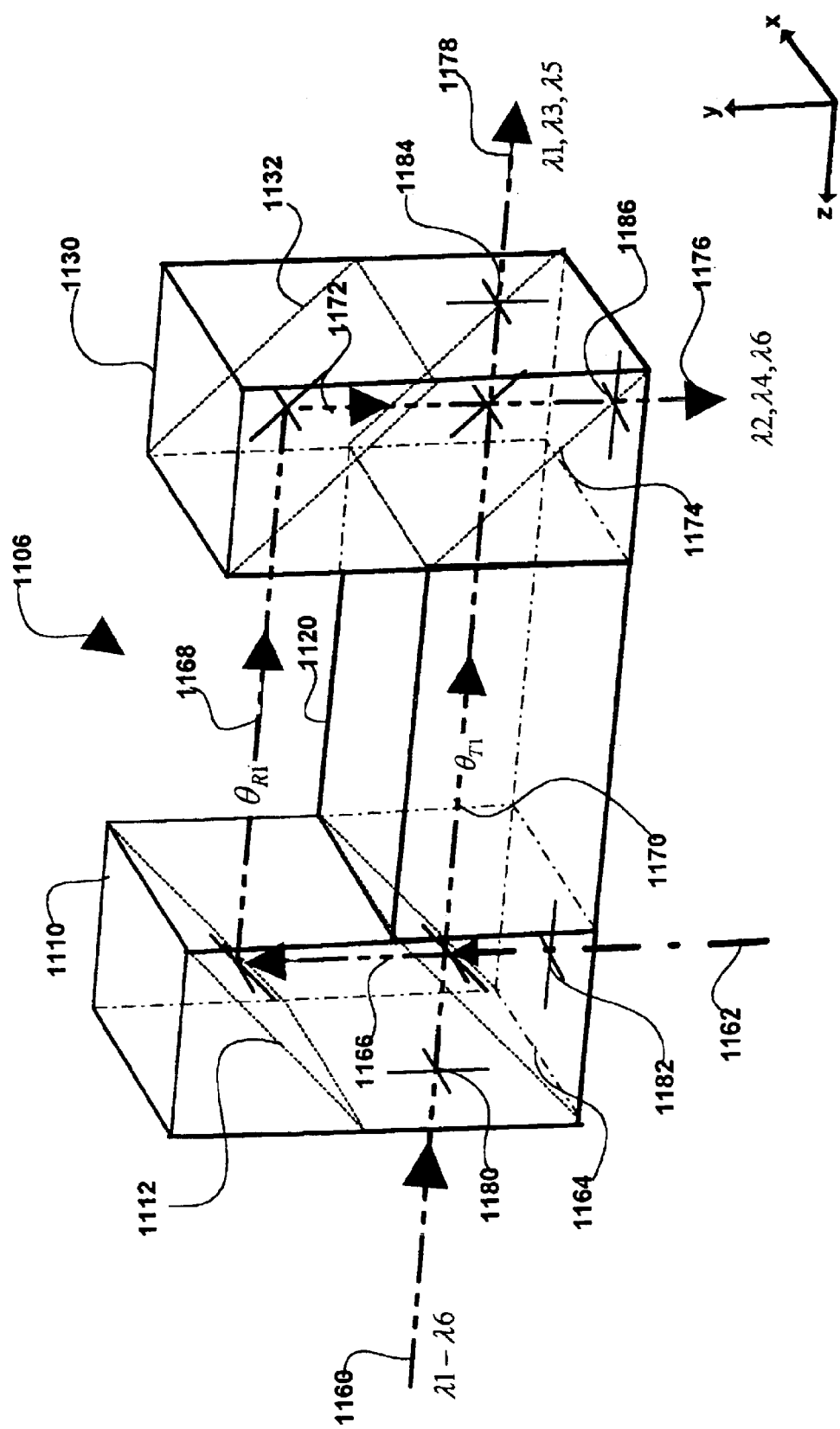
FIG. 8B  INTENSITY MODE

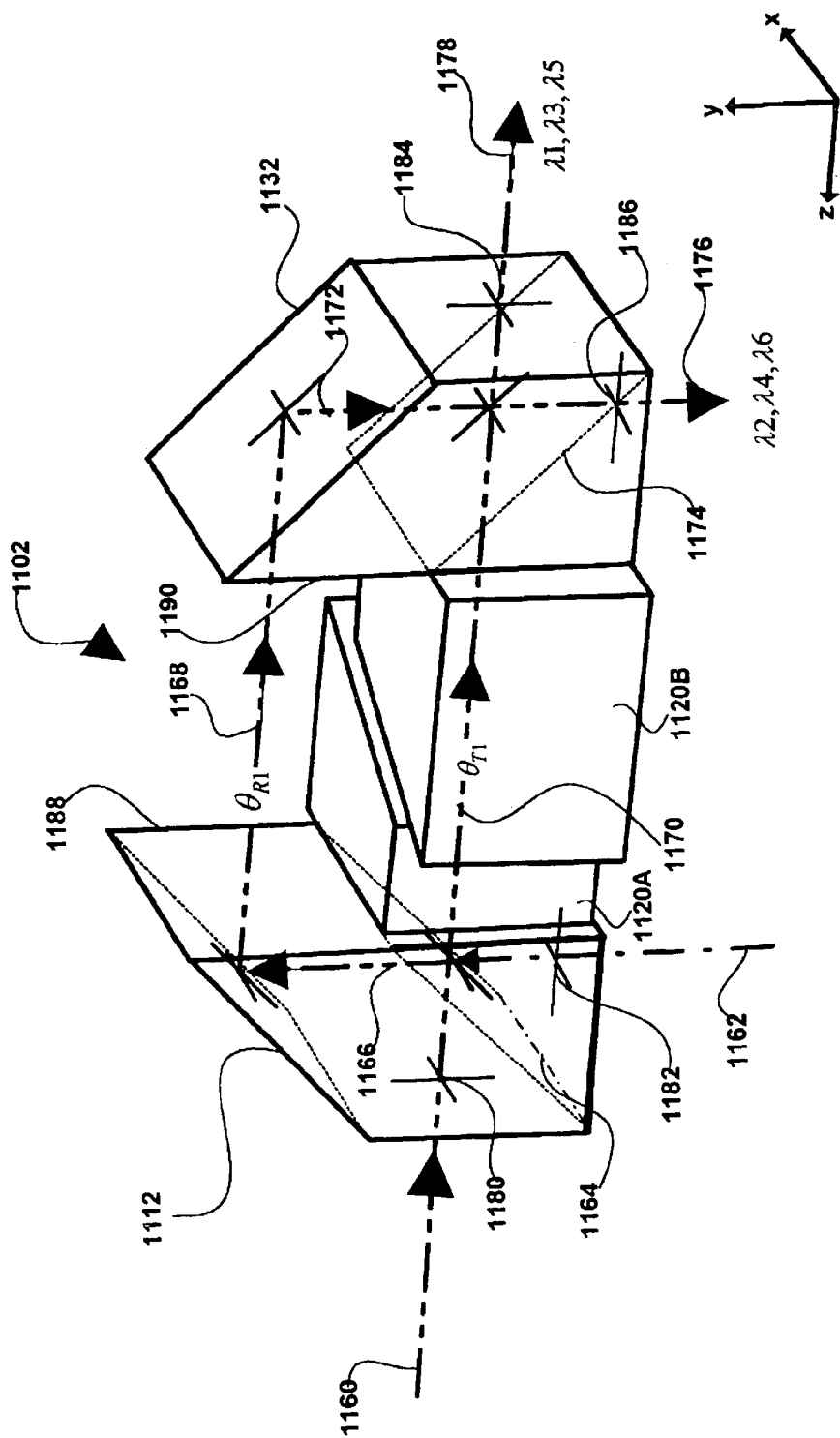
FIG. 8D  INTENSITY MODE

Path 1 = $\cos\phi_1 \cdot \cos\phi_2 \cdot \cos\phi_3 \cdot e^{i(\theta_{S1}+\theta_{S2})}$
Path 2 = $\cos\phi_1 \cdot \sin\phi_2 \cdot -\sin\phi_3 \cdot e^{i(\theta_{S1}+\theta_{P2})}$
Path 3 = $\sin\phi_1 \cdot -\sin\phi_2 \cdot \cos\phi_3 \cdot e^{i(\theta_{P1}+\theta_{S2})}$
Path 4 = $\sin\phi_1 \cdot \cos\phi_2 \cdot -\sin\phi_3 \cdot e^{i(\theta_{P1}+\theta_{P2})}$

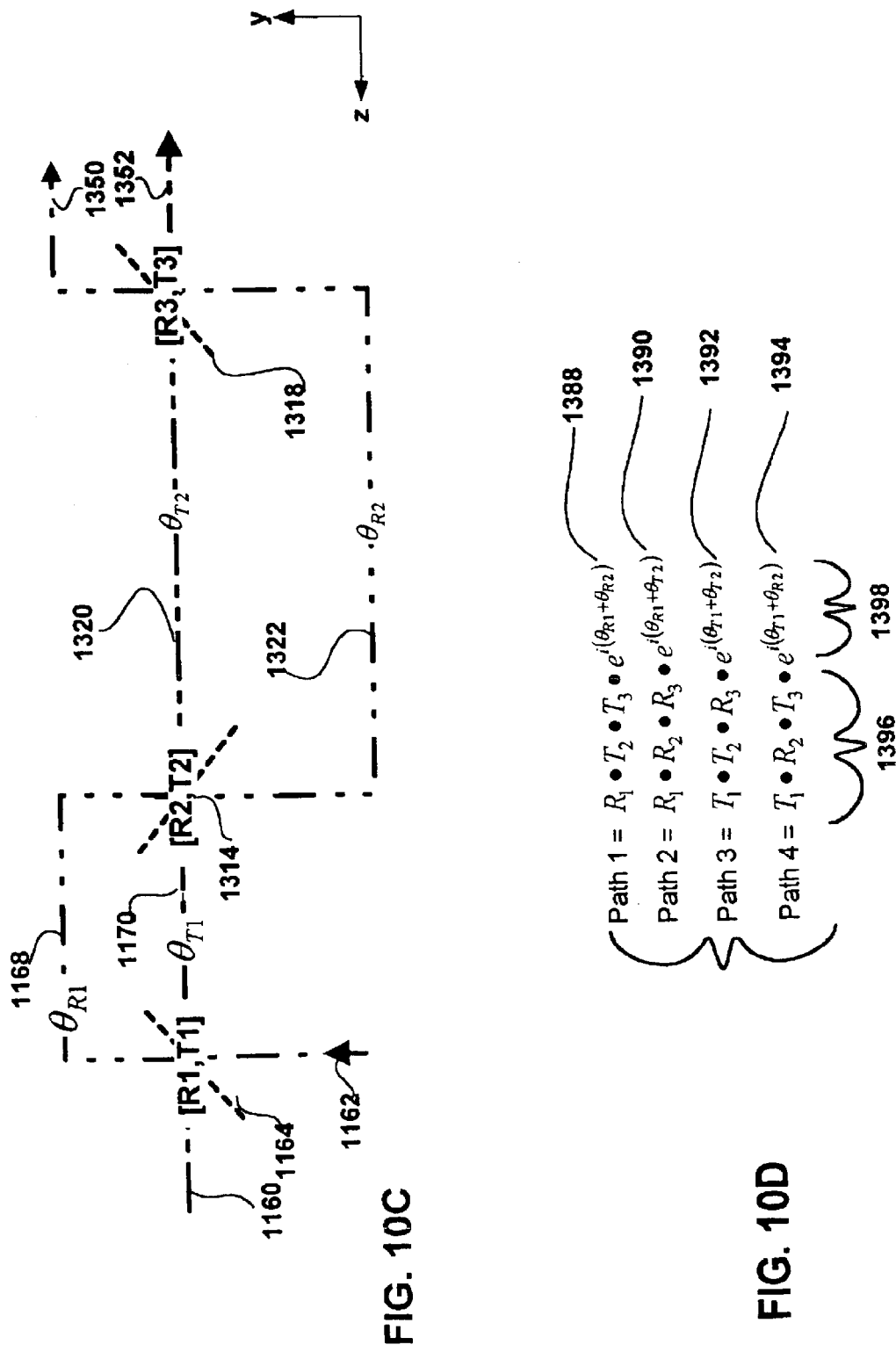

100 US 6,845,191 B1

OPTICAL FILTER FOR WAVELENGTH DIVISION MULTIPLED OPTICAL SIGNALS

CROSS-REFERENCE TO RELATED APPLICATIONS

This application is a divisional of U.S. patent application Ser. No. 09/944,037, filed Aug. 31, 2001, now U.S. Pat. No. 6,684,002, which is a continuation-in-part of U.S. patent application Ser. No. 09/879,026, filed Jun. 11, 2001, now U.S. Pat. No. 6,694,066, and which claims the benefit of U.S. Provisional Patent Application Ser. No. 60/303,705, filed Jul. 5, 2001 and of U.S. Provisional Patent Application Ser. No. 60/269,190, filed Feb. 14, 2001. The foregoing patent applications are incorporated herein by reference.

BACKGROUND OF THE INVENTION

1. The Field of the Invention

The present invention generally relates to optical filters and more particularly to optical filers for optical fiber communication networks.

2. Description of the Related Art

The Synchronous Optical Network (SONET) standard defines a hierarchy of multiplexing levels and standard protocols which allow efficient use of the wide bandwidth of fiber optic cable, while providing a means to merge lower level DS0 and DS1 signals into a common medium. Currently, optical communication is accomplished by what is known as "wavelength division multiplexing" (WDM), in which separate subscriber/data sessions may be handled concurrently on a single optic fiber by means of modulation of each of those subscriber data streams on different portion, a.k.a. channels, of the light spectrum.

The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz (GHz). At this channel separation as many as 128 channels may be supported in C-band alone. Each channel is modulated on a specific center frequency, within the range of 1525–1575 nm, with the center frequency of each channel provided by a corresponding one of 128 semiconductor lasers. The modulated information from each of the semiconductor lasers is combined (multiplexed) onto a single optic fiber for transmission. As the length of a fiber increases the signal strength decreases. To offset signal attenuation erbium doped fiber amplifiers (EDFAs) are used at selected locations along the communication path to boost signal strength for all the channels. At the receiving end the processes is reversed, with all the channels on a single fiber separated (demultiplexed), and demodulated optically and/or electrically.

Optical filters play important roles in handling these optical communications for the telecommunications industry. They perform wavelength multiplexing and demultiplexing of the 128 or more optical channels. They may also be used to gain scale EDFAs by flattening their gain profile.

The requirements for optical filters used for any of these applications are very demanding. The close spacing between the channels in a WDM, makes it desirable to design a WDM with flat pass bands in order to increase the error tolerance. This is primarily because the center wavelength of a transmitter slips with temperature. Further, the cascading of the WDM stages causes the pass bands to become narrower at each WDM down the chain. Therefore, the larger the pass bands the greater the shift tolerance of the channel.

Various devices, such as multi-stage band and comb splitters, have been proposed to fill these new demanding requirements and none are fully satisfactory. In a multi-stage band splitter, the first stage makes a coarse split of two wavelength ranges, and subsequent stages make finer and finer splits of sub-bands within each of the wavelength ranges. In a multi-stage comb splitter, the first de-multiplexing stage filters out two interlaced periodic sets of relatively narrow band passes and the subsequent stages employ wider band pass periodic filters until the individual channels are de-multiplexed. In either case, noise and inter-channel interference are limiting factors in the handling of increasingly narrow band pass requirements. Multi-layer thin-film filters can be used to construct optical filters in bulk optics, but they are undesirable because of an increase in the number of layers for narrow channel spacing, precision of manufacture and expense associated with increasingly narrow band pass requirements. Further, dispersion will become a major issue as channel spacing decreases. Especially at 50 GHz channel spacing, dispersion of thin film filter is so big that it can not be used for OC-192 signal (10 Gbit/sec). Mach-Zehnder interferometers have been widely employed, but they have a sinusoidal response, giving rise to strongly wavelength dependent transmission and a narrow rejection band. Other designs have encountered a variety of practical problem.

Accordingly, there is a need for new optical filters for optical multiplexing/demultiplexing and other optical applications.

SUMMARY OF THE INVENTION

The present invention provides an optical device that can be used in a range of telecommunications applications including optical multiplexers/demultiplexers and optical routers. The optical device splits and combines optical signals of frequency division multiplexed optical communication channels which are evenly spaced apart in frequency from one another. The optical device includes a first filter and a second filter. The first filter splits and combines odd and even channels depending on the propagation direction of the optical signal. The first filter exhibits complementary phase retardations corresponding with odd integer multiples of half a wavelength for each center wavelength associated with a selected one of the odd and even set of channels and with integer multiples of a full wavelength for each center wavelength associated with a remaining one of the odd set and the even set. The second filter couples with the first filter to filter the odd and even sets of channels with phase retardations complementary to those experienced by the odd and even set of channels in the first filter. This complementary filtration has the effect of reducing dispersion in the device.

In an alternate embodiment of the invention the optical device interfaces with a first port communicating odd and even channels and with second and third ports communicating odd and even channels respectively. The optical device includes a linear polarizer, a first filter and a second filter. The linear polarizer couples to the first port for linearly polarizing optical signals. The first filter has a first free spectral range substantially corresponding with the channel spacing between adjacent odd or even channels. The first filter couples with the linear polarizer for splitting and combining odd and even channel sets depending on a propagation direction. The first filter operates as a full waveplate to a selected one of an odd Cannel set and an even channel set and as a half-waveplate to a remaining one of the odd set and the even set. The second filter optically couples with the first filter and the second and third ports. The second filter has a second free spectral range substantially corresponding with the channel spacing between adjacent odd or even channels. The second filter couples with the first filter for optical processing of odd and even channels therewith. The second filter operates as a half-waveplate to the selected one of the odd set and the even set and as a full waveplate to the remaining one of the odd set and the even set. In an alternate embodiment of the invention a method for splitting and combining optical signals is disclosed. The method includes subjecting odd and even channel sets to a first set of phase retardations corresponding with odd integer multiples of half a wavelength for each center wavelength associated with a selected one of the odd set of channels and the even set of channels and corresponding with integer multiples of a full wavelength for each center wavelength associated with a remaining one of the odd set and the even set. The method also includes subjecting odd and even channel sets to a second set of phase retardations corresponding with integer multiples of a full wavelength retardation for each center wavelength associated with the selected one of the odd set and the even set and corresponding with odd integer multiples of a half wavelength retardation for each center wavelength associated with the remaining one of the odd set and the even set.

Associated means are also disclosed.

BRIEF DESCRIPTION OF THE DRAWINGS

These and other features and advantages of the present invention will become ore apparent to those skilled in the art from the following detailed description in conjunction with the appended drawings in which:

FIG. 1 is a hardware block diagram of a multiplexer/demultiplexer (Mux/Demux) fabricated in accordance with the current invention FIGS. 2A–B are graphs of frequency vs. phase retardation in the mux/demux shown in FIG. 1.

FIGS. 4A–E are signal diagrams showing filter functions at various locations along the optical path of the mux/demux shown in FIG. 1.

FIGS. 7B–C are top/plan and side/elevation views of the mux/demux shown in FIG. 7A FIG. 7D shows polarization diagrams for light propagating through the mux/demux shown in FIGS. 7A–C.

FIG. 8B is an isometric view of an optical filter cell with couplers employing intensity dependent beam splitting linked by a pair of delay paths.

FIG. 8D is an isometric view of an optical filter cell shown in FIG. 8B with one of the optical elements configured for adjustment of the center wavelength and free spectral range of the filter and with an alternate coupler configuration.

FIG. 10C is a side elevation view of the variable coupling between cells of the multi-cell implementation shown in FIG. 10A FIG. 10D shows the individual transforms associated with each of the optical paths shown in FIG. 10A.

DETAILED DESCRIPTION OF THE EMBODIMENT

Figure 3B:
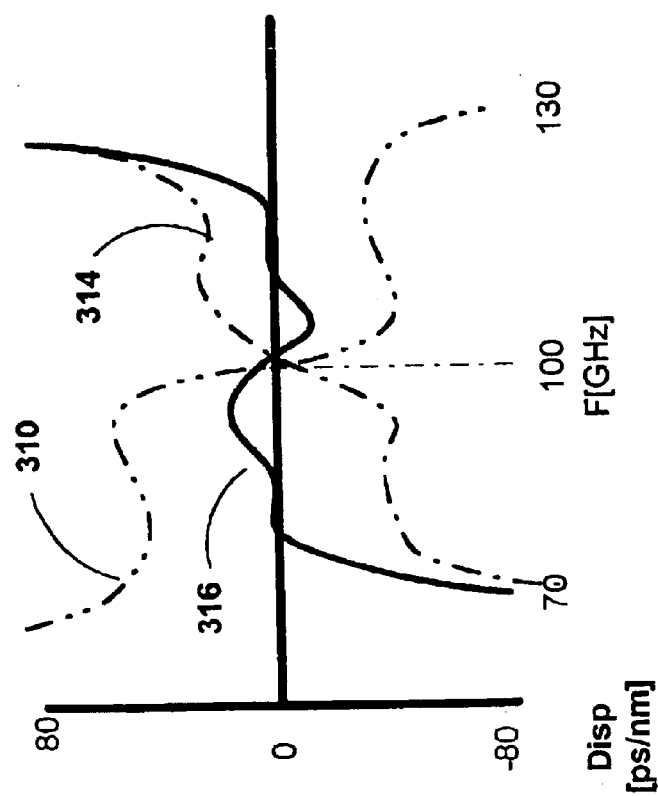
FIGS. 3A–B are graphs showing the complementary dispersions profiles about a representative center frequency of one of the channels.

FIG. 1 is a hardware block diagram of a multiplexer/demultiplexer (Mux/Demux) fabricated in accordance with the current invention. The mux/demux is designed to operate on the narrowly spaced frequency division multiplexed channels of a telecommunications grid. These channels may be spaced apart in frequency at 50 GHz intervals or less. The mux/demux can depending on the propagation direction of an optical signal, split or combine an optical stream with 50 GHz channel spacing into two separate optical streams with odd and even 100 GHz channel spacing respectively and vice versa. The mux/demux shown in FIG. 1 separates/combines odd and even channel sets, with a higher degree of isolation and a lower dispersion than prior art designs. It may be used in combination with other stages of similar or different design to separate out each individual channel of a telecommunications or other communication grid.

The mux/demux includes at least two sub-stages 190-192. Sub-stage 190 accepts an optical communication signal 102 at an interleave port 104 of a filter 100 and provides optical outputs in the form of de-interleaved odd and even channel components of the signal at ports 106–108 respectively. Sub-stage 192 includes two filters 130, 160 each of a similar configuration with filter 100. Each filter 130, 160 accepts a corresponding one of the de-interleaved odd and even components from sub-stage 190 at interleave ports 134, 164 respectively and performs further isolation of the odd and even channel components. Filter 130 outputs the odd channel components at port 138 with the remaining port 136 serving as a dump port. Filter 160 outputs the even channel components at port 166 with the remaining port 168 serving as a dump port. The propagation direction of light determines whether the device performs as a multiplexer or de-multiplexer.

Each filter in each sub-stage may include one or more filter cells. In the embodiment shown sub-stage 190 includes two filter cells, 110, 120 serially coupled to one another between an interleave port 104 and de-interleave ports 106–108 by couplers 112, 118, 122. Each cell includes a pair of delay paths. Within cell 110 delay paths 114, 116 are shown. One path has a shorter optical pathlength than the other and will be identified as the fast path, with the other identified as the slow path. Light traversing the paths will at any given frequency experience a phase retardation proportionate to the difference in the pathlengths between the slow and fast paths. The couplers 112, 118 define the amount of light which will be split/combined from/to each delay path within cell 110. The couplers 118, 122 define the amount of light which will be split/combined from/to each delay path within cell 120.

Sub-stage 192 includes filters 130 and 160. Filter 130 includes two filter cells, 140, 150 serially coupled to one another between an interleave port 134 and de-interleave ports 136–138 by couplers 142, 148, 152. Each cell includes a pair of delay paths. Within cell 140 delay paths 144, 146 are shown. The couplers 142, 148 define the amount of light which will be split/combined from/to each delay path within cell 140. The couplers 148, 152 define the amount of light which will be split/combined from/to each delay path with cell 150. Filter 160 includes two filer cells, 170, 180 serially coupled to one another between an interleave port 164 and de-interleave ports 166–168 by couplers 172, 178, 182. Each cell includes a pair of delay paths. Within cell 170 delay paths 174, 176 are shown. The couplers 172, 178 define the amount of light which will be split/combined from/to each delay path within cell 170. The couplers 178, 182 define the amount of light which will be split/combined from/to each delay path within cell 180.

Delay paths may be defined by a range of optical elements including: birefringent crystals, semiconductor waveguides and optical fibers for example. Delay paths may also be formed by discrete optical components such as those shown in the following FIGS. 8–10. Couplers may split/combine light on the basis of intensity or polarization for example.

The combination of first cell and subsequent cells can be looked at as establishing by the difference between their delay paths the fundamental sinusoidal harmonic for the sequence and higher order harmonics. One of the cells in the sequence, a.k.a the fundamental cell, is designed with a FSR corresponding with the desired fundamental harmonic. Others of the cells, a.k.a the harmonic cell(s) are designed with FSRs which are integer factions of the base FSR. The coefficients or amplitude of each harmonic are provided by varying the coupling ratio/percentage/coefficients between the cells. Whether a sub-stage includes within a filter a single filter cell or multiple serially coupled filter cells, at least one of the cells i.e. the fundamental cell, in each filter exhibits a free spectral range (FSR) which corresponds with the periodic frequency spacing between the odd or even channels, e.g. 100 GHzThe optical path length difference between the two delay paths in a filter, corresponds inversely with the free spectral range (FSR) exhibited by the filter. This relationship is set forth in the following Equation 1.

$$FSR = \left(\frac{c}{|L_I - L_J|}\right) \quad \text{Equation 1}$$

where $L_I$ and $L_J$ are the total optical path length of each of the delay paths. In each filter of a sub-stage additional filter cells, formed from delay path pairs may be serially coupled to one another. Where a filter includes more than one filter cell the delay paths formed thereby are serially coupled to provide a plurality of distinct delays along a plurality of combinations of optical paths from the input to the output of the stage. The spectral characteristics of the output beam(s) formed thereby correspond to the sum of a Fourier series in which each term corresponds in amplitude and phase with each of the plurality of combinations of optical paths between the input and the output(s). The fundamental cell provides the fundamental frequency component corresponding with the spacing between adjacent odd and adjacent even channels. Additional cells may provide the harmonics, required for establishing a flat top composite comb filter function for the mux/demux such as that shown in FIG. 4E.

Figure 3A:
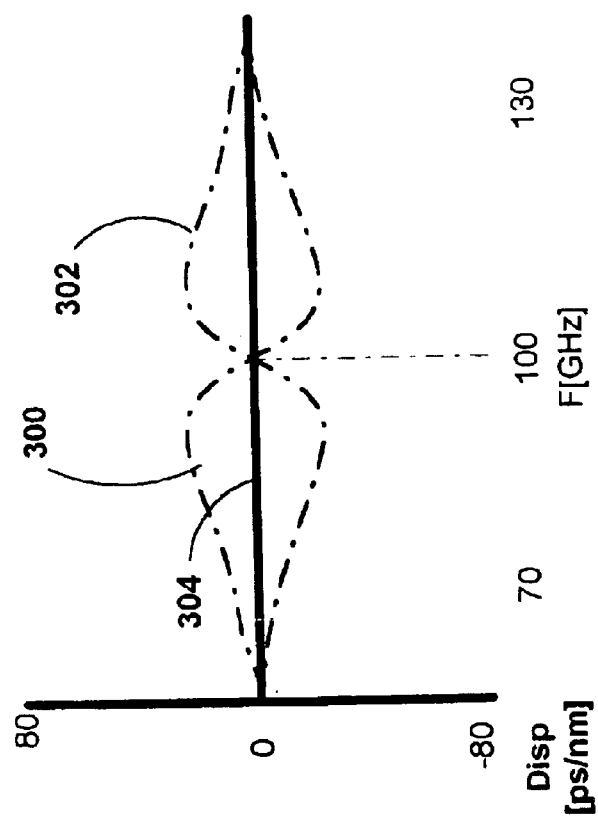

The mux/demux shows improvements in dispersion over prior art designs as a result of an optical pathlength shift between the fundamental cell, e.g. cell 110, in the first sub-stage 190 and the fundamental cell(s) in the second sub-stage 192, e.g. cells 140, 170. The fundamental cell(s) in the second sub-stage have an optical pathlength difference shifted from the optical pathlength difference of the fundamental cell in the first stage by odd integer multiples of one-half of the wavelength of interest as shown in the following Equation 2:

$$OPD_{F1} + (2N+1)\frac{\lambda}{2} = OPD_{F2} \quad \text{Equation 2}$$

where $OPD_{F1}$ is the optical pathlength difference of the fundamental cell in the first sub-stage and $OPD_{F2}$ is the optical pathlength difference of the fundamental cell(s) in the second sub-stage. This shift results in substantially complementary dispersion profiles for theft and second sub-stages 190–192, the net effect of which is a normalization of dispersion in each communication channel and a concomitant improvement in signal integrity each telecommunications channel as shown in FIGS. 3A–B. This shift is achieved with a negligible deviation, e.g. less than 0.3%, between the FSR of the fundamental cell 110 of sub-stage 190 and the FSRs of the fundamental cells 140, 170 of sub-stage 192.

FIGS. 2A–8 are graphs of frequency, expressed in terms of increasing channel number (y axis) vs. phase retardation (x axis) between the two delay paths for the fundamental cell(s) 110, and 130, 160 in the sub-stages 190–192 respectively. Frequency is represented by channel number with channels 9–13 shown and with each channel having a fixed center frequency/wavelength. Channels 9–10 might for example be spaced apart by a 50 GHz interval and be centered on 1549.315 nm and 1550.116 nm wavelengths. The relationship between phase shift and frequency is shown in the following Equation 3:

$$PhaseShift \equiv 2\pi\frac{\Delta L}{\lambda_0} \equiv 2\pi f\frac{\Delta L}{c} \quad \text{Equation 3}$$

where $\Delta L$ is the optical pathlength difference, f is the frequency and c is the speed of light in free space. The phase shift increases linearly with optical pathlength difference and with frequency. In the example shown channel numbers, e.g., Cb 9–Ch 13, are evenly spaced apart in frequency, thus in this example the vertical was corresponds with frequency, expressed in terms of channel number. The linear relationship between phase retardation and frequency is shown in line 200 which bisects the x and y axis. The mux/demux fundamental cells in the fist and second stages are designed to subject the odd channel center frequencies and the even channel center wavelengths to asymmetrical phase shifts both within the cell as well as between stages. The graphs shown in FIGS. 2A–B show one of two possible phase shift relationships for odd and even wavelengths.

FIG. 2A shows phase retardation in the first sub-stage for fundamental cell 110. The intersects of Channels 9–12 with line 200 are shown projected onto the x axis. The intersect 202 for Channel 10 and 204 for Channel 11 are explicitly referenced. Odd channels in this example, experience phase retardations of half that of the incident wavelength or odd integer multiples thereof. Thus Channels 9 and 11 are shown experiencing absolute phase retardations across the slow path as compared to the fast path of 180° and 540° respectively. Even channels in this example, experience phase retardations equal to the incident wavelength or integer multiples thereof. Thus Channels 10 and 12 are shown experiencing absolute phase retardations across the slow path as compared to the fast path of 360° and 720° respectively FIG. 2B shows phase retardation in the second sub-stage for either of the fundamental cells 140 and 170. The retardations for the odd channels and even channels are now shifted so as to experience a retardation complementary to that experienced in the first stage. The intersect 206 for Channel 10 and 208 for Channel 11 are shown. Odd channels in the second sub-stage fundamental cell experience phase retardations of the incident wavelength or integer multiples thereof. Thus Channels 11 and 13 are shown experiencing absolute phase retardations across the slow path as compared to the fast path of 380° and 720° respectively. Even channels in this example, experience phase retardations equal to half the incident wavelength or odd integer multiples thereof. Thus Channels 10 and 12 are shown experiencing absolute phase retardations across the slow path as compared to the fast path of 180° and 540° respectively.

In an alternate embodiment of the invention the asymmetry may be reversed with the even channels experience phase retardations of half that of the incident wavelength or odd integer multiples thereof in the first sub-stage fundamental cell and retardations of the incident wavelength or integer multiples thereof in the fundamental cell of the second sub-stage. Conversely, in this alternate embodiment the odd channels experience phase retardations of the incident wavelength or integer multiples thereof in the first sub-stage fundamental cell and retardations of the half the incident wavelength or odd integer multiples thereof in the fundamental cell of the second sub-stage.

FIGS. 3A–B are graphs showing the complementary dispersion profiles about a representative center frequency of one of the channels. FIG. 3A shows a representative dispersion profile where coupling of light onto fast and slow paths is in equal proportions. The dispersion profiles 300 and 302 for the individual sub-stages are shown along with the substantially flat line composite dispersion 304. The flat line dispersion profile which results from the asymmetrical phase retardation in the fundamental cells of the first and second sub-stages is advantageous because it improves the signal integrity associated with multiplexing and de-multiplexing telecom communications.

FIG. 3B shows a representative dispersion profile where coupling of light onto fast and slow paths is in unequal proportions. The dispersion profiles 310 and 314 for the individual sub-stages are shown along with the composite dispersion 316. The composite dispersion exhibits some deviation from the desired flat line response but the tradeoff in terms of enhanced stop bends in the filter transform is appropriate for some applications as will be shown in the following FIGS. 4A–E.

FIGS. 4A–E are sign diagrams showing filter functions at various locations along the optical path of the mux/demux shown in FIG. 1. In this embodiment of the invention couplers 112, 118, 122 and 142, 148, 152 and 172, 178, 182 couple light asymmetrically onto the fist and slow pats of each cell.

The signal diagrams shown in FIGS. 4A–B show the different comb filter functions to which the even channels are exposed in the first sub-stage and the second sub-stage respectively. The first comb filter function to which the even channels are exposed in the first sub-stage includes passbands for the even channels interlaced with residual components, or bleed through, of the odd channels and is shown in FIG. 4A. In the first sub-stage, in this example the even channels are subject to a phase retardation substantially equal to the incident wavelength or integer multiples thereof. Thus there is a passband 160 for channel 10 and one for channel 12. The center frequency 164 for the passband for channel 12 coincides with a selected order of the incident wavelength, e.g. order 3875. Between the passbands for the even channels there is a bleed through of the odd passbands below the −10 dB level. The bleed through 162 for channel 11, as well as channels 9 and 13 are shown. This bleed through results from asymmetric coupling of light onto the fast and slow paths in amounts other than 50%/50%.

The coupling asymmetries in the first filter between the fast and slow paths of each filter cell are continued within each filter and the filter cells thereof in the second sub-stage as shown for the even channels in FIG. 4B. Because of the wavelength shift of λ/2 or odd integer multiples thereof, in the optical pathlength difference between the fundamental cells of the first sub-stage and the second sub-stage, the even channels are subject to a second comb filter function different than that to which they were exposed in the first sub-stage. This second comb filter function shown in FIG. 4B includes narrow stop bands, and substantially attenuated bleed-through of the odd channels. There is a passband 166 for channel 10 and one for channel 12 with a slight dip in the flat top. The center frequency 164 for channel 12 coincides with a different selected order of the incident wavelength, e.g. order 3876 than was the case in the filter of the fist sub-stage as shown in FIG. 4A The signal diagrams shown in FIGS. 4C–D show the comb filter functions to which the odd channels are exposed in the first sub-stage and the second sub-stage respectively. In the fist sub-stage, in this example the odd channels are subject to the second comb filter function with a wavelength shift of λ/2 or odd integer multiples thereof. Thus there is a passband 170 for channel 11 and one for channels 9 and 13. The center frequency 164 for the passband for channel 12 coincides with a selected order of the incident wavelength, e.g. order 3875. The filter function for the odd channels in the first sub-stage exhibits narrow stop bands, and substantially attenuated bleed-through. The coupling asymmetries in the first filter between the fast and slow paths of each filter cell are continued within the filter(s) and the filter cells thereof in the second sub-stage.

As show in FIG. 4D the wavelength shift of λ/2 in the optical pathlength difference between the fundamental cells of the first sub-stage and the second sub-stage results in the odd channels also being subject to a different, i.e. complementary filter function to that experienced in the first sub-stage. The odd channels are exposed to the first comb filter function with a wavelength shift of λ/2 or odd integer multiples thereof. There is a passband 174 for channel 11 and one for channels 9, 13. Between the passbands for the odd channels there is a bleed through of the even passbands below the −10 dB level. The bleed through 172 for channel 10, as well as channel 12 is shown. This bleed through results from asymmetric coupling of light onto the fast and slow paths in amounts other than 50%/50%. The sane coupling ratios used in the first sub-stage are applied in the second stage. The center frequency 164 for the passband for channel 12 coincides with a different selected order of the incident wavelength, e.g. order 3876 than was the case in the filter of the first sub-stage as shown in FIG. 4C.

Figure 5A:
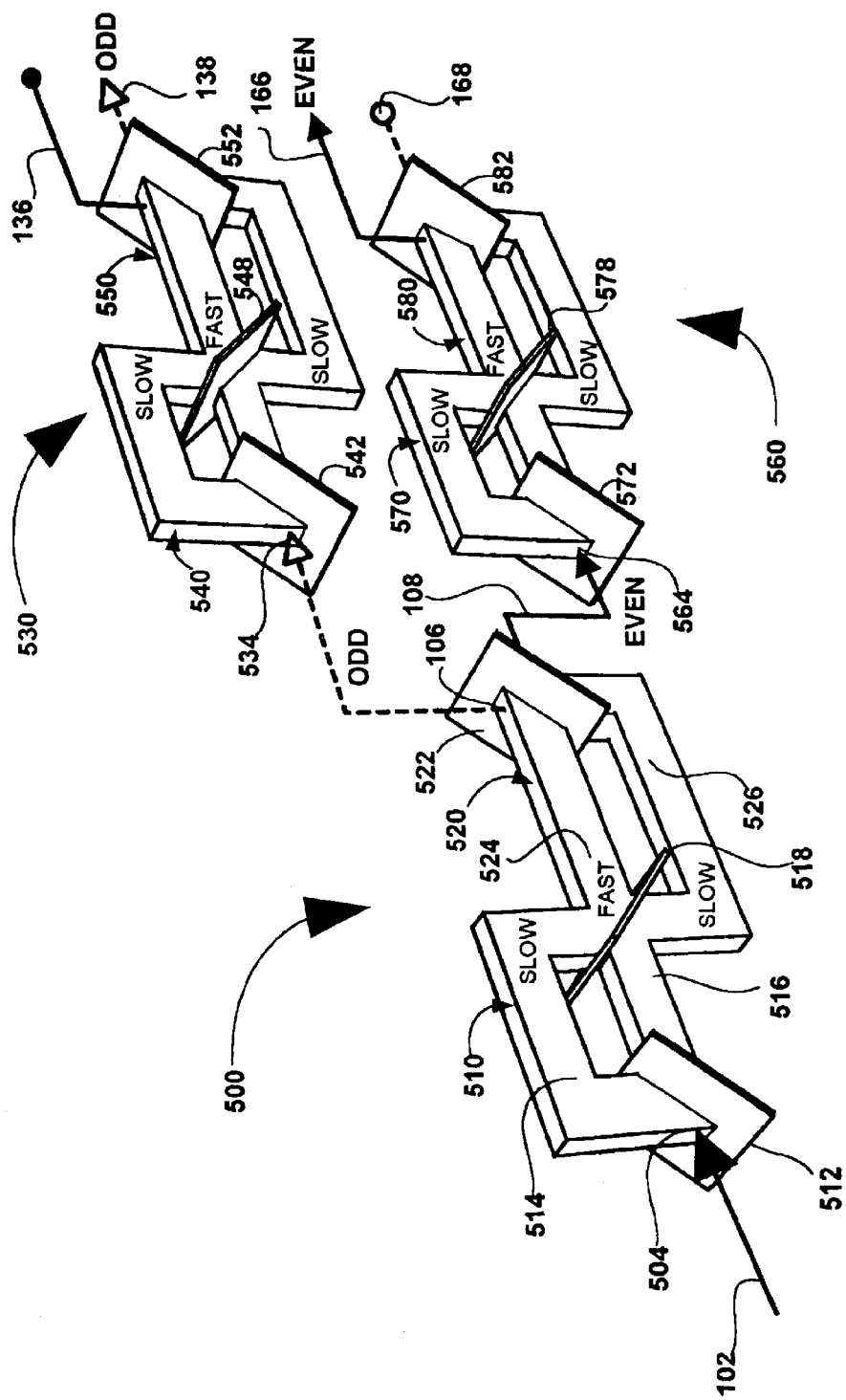
FIGS. 5A–B are isometric views showing alternate embodiments of a mux/demux shown in FIG. 1.
Figure 5B:
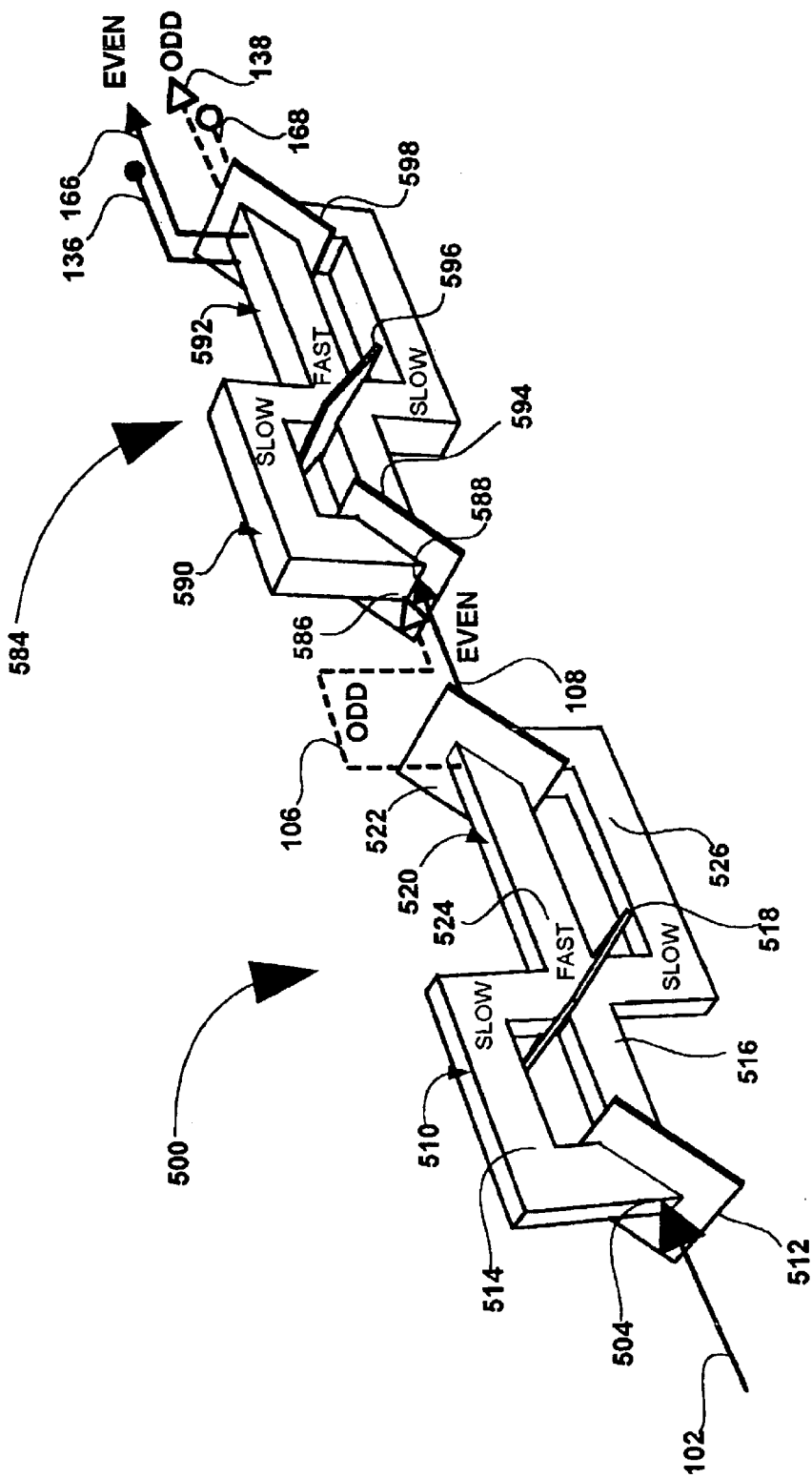

FIG. 4E shows the composite performance for the mux/demux for both the odd and even channels. The passband 210 for even channel 10 as well as for channel 12 is shown. The passband 212 for odd channel 11 as well as for channels 9, 13 are shown. Each passband exhibits steep side profiles and broad stopbands when compared with prior art designs. The passband 212 for channel 11 is shown with a broad flat top 204 and with broad passbands 216–218. Supposed on the passband 212 is a skirt 220 representative of traditional passband profiles. By comparison the current mux/demux exhibits a significant improvement in the passband profiles it generates with relatively steeper sides and broader stopbands. These improvements translate into increases in the signal integrity of the telecommunications data handled by the mux/demux FIGS. 5A–B are isometric views showing alternate embodiments of a mux/demux shown in FIG. 1. In this embodiment of the invention couplers split light on the basis of intensity between fast and slow delay paths within each filter cell. The delay path pairs in these embodiments may be fabricated from optical fibers, semiconductor waveguides, or discrete micro-optic elements for example. Examples of the latter are described and discussed in connection with the following FIGS. 8, 10. The intensity couplers may be fabricated from fused optical fibers, within waveguides, or as dielectric coatings on optical elements for example. Examples of the latter are described and discussed in connection with the following FIGS. 8, 10.

In FIG. 5A the first sub-stage includes filter 500 and the second sub-stage includes filters 530 and 560. Filter 500 accepts an optical communication signal 102 at an interleave port 504 and provides optical outputs in the form of de-interleaved odd and even channel components of the signal at ports 106–108 respectively. The second sub-stage includes two filters 530, 560. Each filter 530, 560 accepts a corresponding one of the de-interleaved odd and even components from the filter 500 of the first sub stage at interleave ports 534, 564 respectively and performs for further isolation of the odd and even channel components. Filter 530 outputs the odd channel components at port 138 with the renaming port 136 serving as a dump port. Filter 560 outputs the even channel components at port 166 with the remaining port 168 serving as a dump port. The propagation direction of light determines whether the device perform as a multiplexer or de-multiplexer.

Each filter in each sub-stage may include one or more filter cells. In the embodiment shown the filter 500 of the first sub-stage includes two filter cells, 510, 520 serially coupled to one another between the interleave port 504 and de-interleave ports 506–508 by couplers 512, 518, 522. Each filter cell includes a pair of delay paths. Within filter cell 510 delay paths 514, 516 are shown. One path has a shorter optical pathlength than the other and will be identified as the fast path, with the other identified as the slow path. Optical pathlength is a product of the physical distance "d" of an optical path and the index of refraction "n" along the path. If path 514 and 516 are made from the same optical material then path 514 will have the longer optical pathlength and will thus be identified as the slow path. Path 516 would in therefore be identified as the fast path. Light traversing the paths will at any given frequency experience a phase retardation proportionate to the difference in the pathlengths between the slow and fast paths. The couplers 512, 518 define the amount of light which will be split/combined from/to each delay path within cell 510. The couplers 518, 522 define the amount of light which will be split/combined from/to each delay path 524, 526 within cell 520.

The second sub-stage includes filters 530 and 560. Filter 530 includes two filter cells, 540, 550 serially coupled to one another between an interleave port 534 and de-interleave ports 136–138 by couplers 542, 548, 552. Each cell includes a pair of delay paths. The couplers 542, 548 define the amount of light which will be split/combined from/to each delay path within cell 540. In an embodiment of the invention the coupling ratios are the same as the coupling ratios for the filter 500 of the first stage. The couplers 548, 552 define the amount of light which will be split/combined from/to each delay path within cell 550. Filter 560 includes two filter cells, 570, 580 serially coupled to one another between an interleave port 564 and de-interleave ports 166–168 by couplers 572, 578, 582. Each cell includes a pair of delay paths. The couplers 572, 578 define the amount of light which will be split/combined from/to each delay path with cell 570. The couplers 578, 582 define the amount of light which will be split/combined from/to each delay path within cell 580.

Delay paths may be defined by a range of optical elements including semiconductor waveguides and optical fibers for example. Delay paths may also be formed by discrete optical components such as those shown in the following FIGS. 8–10. The couplers may which split/combine light on the basis of intensity may be fabricated from transmissive/reflective dielectric coatings. Whether a sub-stage includes within a filter a single filter cell or multiple serially coupled filter cells, at least one of the cells, a.k.a. a fundamental cell, in each filter exhibits a free spectral range (FSR) which corresponds with the periodic frequency spacing between the odd or even channels, e.g. 100 GHz. In the embodiment shown in FIG. 5A cell 510 in the first sub-stage and cells 540, 570 in the second stage might for example serve as the fundamental cells. The FSR of the second sub-stages fundamental cell(s) is adjusted by a fractional percent, or more particularly by an amount which results in the optical pathlength difference in the fundamental cell(s) of the second sub-stage which diverges from that of the fundamental cell of the first sub-stage by half the incident wavelength. This divergence results in the shift discussed above in connection with FIGS. 2–4, which widens the stopbands of exhibited by the overall device.

FIG. 5B is an isometric view showing an alternate embodiment of the mux/demux shown in FIG. 5A in which the second sub-stage comprises a single filter 584 coupled to both the de-interleaved ports 106, 108 of the first sub-stage filter 500. Filter 584 includes two interleaved input ports 586, 588 and four do-interleaved output ports 166, 138 and 136, 168. The latter two ports, 136, 168 are dump ports. The optical signals with both odd and even channel components are processed along parallel optical paths within the filter 584. The filter includes two filter cells 590, 592. Light is split/combined along the fast and slow path of the first filter cell 590 via couplers 594, 596. Light is split/combined along the fast and slow paths of the second filter cell 592 by the couplers 596, 598.

In an embodiment of the invention suitable coupling percentages onto the fast and slow paths are determined by the transmission/reflection ratios for each of couplers 512, 518, 522 in the first filter. Symmetric coupling would for be satisfied by couplers with 50%/50% transmission/reflection. For asymmetrical coupling in accordance with the current invention the following Table 1 sets forth two among many acceptable asymmetric coupling possibilities for embodiments of the invention in which each sub-stage includes within a corresponding filter(s) two filter cells, interlaced with three couplers such as those shown in either FIGS. 5A–B.

TABLE 1

| | Input Intensity | $1^{st}$ Cplr % Tx | Slow % Fast % | $2^{nd}$ Cplr % Tx | Slow % Fast % | $3^{rd}$ Cplr % Tx | Slow % Fast % |
|---|---|---|---|---|---|---|---|
| Case 1 | 1 | 67% | 67% 33% | 28% | 28% 72% | 85% | 85% 15% |
| Case 2 | 1 | 59% | 59% 41% | 30% | 30% 70% | 91% | 91% 9% |

Figure 6:
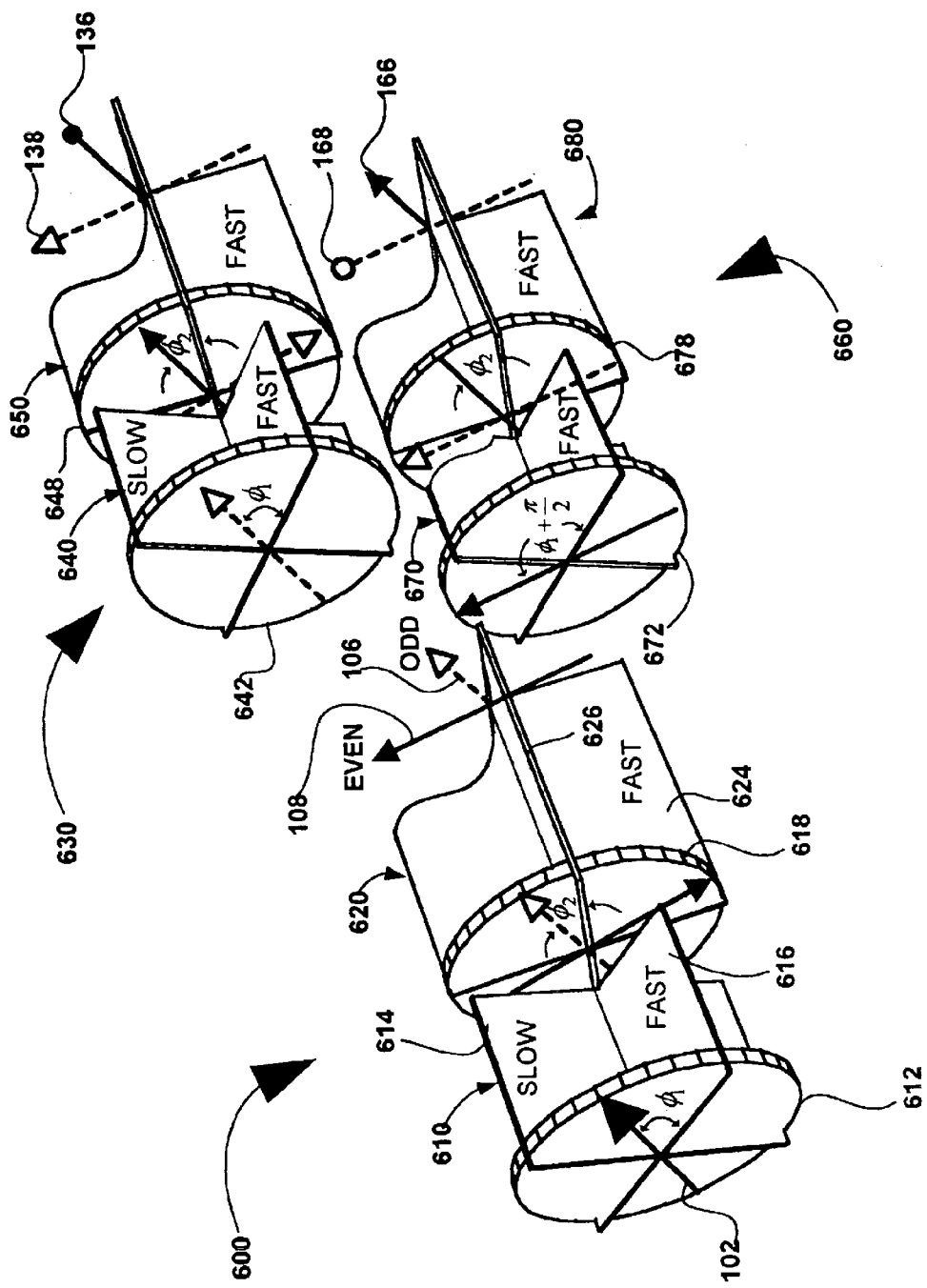
FIG. 6 is an isometric view of an alternate embodiment of the invention in which polarization couplers, rather than intensity couplers are used to split/combine optical signals within the mux/demux.

FIG. 6 is an isometric view of an alternate embodiment of the invention in which polarization couplers, rather than intensity couplers are used to split/combine optical signals within the mux/demux. The delay path pairs in this embodiment may be fabricated from optical fibers, semiconductor waveguides, or discrete micro-optic elements for example. Examples of the latter are described and discussed in connection with the following FIGS. 8, 9. The polarization couplers ma be fabricated from birefringent crystals or as dielectric coat on optical elements for example. Examples of the latter are described and discussed in connection with the following FIGS. 8, 9.

In FIG. 6 the first sub-stage includes filter 600 and the second sub-stage includes filters 630 and 66. Filter 600 accepts an optical communication in the form of a linearly polarized input signal 102 at an angle $\phi_1$ with respect to the optical axis at coupler 612. The optical axis may coincide with one or the other of the fast and slow axis. The filter 600 provides optical outputs in the form of de-interleaved odd 106 and even 108 channel components of the input signal. Each filter 630, 660 of the second sub-stage accepts a corresponding one of the de-interleaved odd and even components from the filter 600 of the first sub-stage at polarization couplers 642, 672 respectively and performs further isolation of the odd and even channel components. The odd and even channel components are also communicated with the corresponding filter of the second stage in the form of linearly polarized light with input vectors of $\phi$ and $0.5\pi+\phi$ with respect to the couplers 642, 672 respectively. Filter 630 outputs the odd channel components at port 138 with the remaining port 136 serving as a dump port. Filter 660 outputs the even channel components at port 166 with the remaining port 168 serving as a dump port. The propagation direction of light determines whether the device performs as a multiplexer or demultiplexer.

Each filter in each sub-stage may include one or more filter cells. In the embodiment shown the filter 600 of the first sub-stage includes two filter cells, 610, 620 serially coupled to one another by couplers 612 and 618. Each filter cell includes a pair of delay paths. Within filter cell 610 delay paths 614, 616 are shown. One path has a shorter optical pathlength than the other and will be identified as the fist path, with the other identified as the slow path. Within cell 620 fast 624 and slow 626 delay paths are also shown. Optical pathlength is a product of the physical distance "d" of an optical path and the index of refraction "n" along the path. If path 614 and 616 are made from the same optical material as in the case where a birefringent crystal forms the filter cell 610, then whichever of the "e" or "o" ray experiences a higher index of refraction along the optical path will be characterized as the slow path. Light traversing the paths will at any given frequency experience a phase retardation proportionate to the difference in the pathlengths between the slow and fast paths. The amount of light coupled onto the slow and fast paths 614, 616 in cell 610 is determined by the angle $\phi$ of the input vector with respect to the optical axis. Where the cell is fabricated from a birefringent crystal the coupler, slow and fast axis are integral with the optical axis defined by the crystalline structure of the birefringent crystal. Where the cell if formed from a polarization coupler and fast and slow paths discrete from the polarization coupler then the optical axis is the optical axis of the coupler. In the embodiment shown light propagating in the forward direction from input 102 couples with the first cell at an angle $\phi_1$ with respect to the optical axis of the coupler 612 and/or cell 610 and at an angle $\phi_2$ with respect to the optical axis of the coupler 618 and/or cell 620.

The second sub-stage includes filters 630 and 660. Filter 630 includes two filter calls, 640, 650 serial coupled to one another by couplers 642 and 648. Each serially coupled to one another by couplers 672 and 678. Each cell includes a pair of delay paths. The couplers of each filter in the second stage generally exhibit the same coupling ratios as the couplers in the filter of the first sub-stage. Del paths may be defined by a range of optical elements including: birefringent crystals, semiconductor waveguides and optical fibers for example. Delay paths may also be formed by discrete optical components such as those shown in the following FIGS. 8–9. The couplers may be fabricated from birefringent crystals, or polarization sensitive dielectric coatings, such as those discussed in connection with FIGS. 8–9.

Whether a sub-stage includes within a filter a single filter cell or multiple serialy coupled filter cells, at least one of the cells, a.k.a a fundamental cell, in each filter exhibits a free spectral range (FSR) which corresponds with the periodic frequency spacing between the odd or even channels, e.g. 100 GHz. The fundamental cell may in a multi-cell embodiment be placed in any sequence with respect to the other cells of the filter. In the embodiment shown in FIG. 6, cell 610 in the first sub-stage and cells 640, 670 in the second stage might for example serve as the fundamental cells. The FSR of the second sub-stages fundamental cell(s) is adjusted by a fractional percent, or more particularly by an amount which results in an optical pathlength difference in the fundamental cell(s) of the second sub-stage which diverges from that of the fundamental cell of the first sub-stage by half the incident wavelength. This divergence results in the shift discussed above in connection with FIGS. 2–4, which widens the stopbands of exhibited by the overall device.

The odd and even channel sets within an optical signal experience the filtering of the fundamental cell 610 of the first sub-stage differently. The fundamental cell of the first sub-stage operates as a full waveplate to a selected one of an odd channel set and an even channel set and as a half-waveplate to a remaining one of the odd set and the even set.

Within the fundamental cell(s) 640, 670 of the second sub-stage the opposite filtration effect is experienced by the odd and even channel sets. The fundamental cell(s) of the second sub-stage operate as a half-waveplate to the selected one of the odd set and the even set and as a full waveplate to the remaining one of the odd set and the even set. Where a selected channel set odd/even experiences the fundamental cell as a half waveplate linearly polarized light with frequency components associated with the selected channel set which enters the cell with one polarization vector, emerges from the cell with a relative phase shift of ½ π and a rotation in the associated polarization vector in the direction of the optical axis of the coupler in an amount 2φ where φ is the angle between the input polarization vector and the optic axis of the cell. Where a selected channel set odd/even experiences the fundamental cell as a full waveplate linearly polarized fight with frequency components associated with the selected channel set which enters the cell with one polarization vector, emerges from the cell with the same polarization vector.

In the embodiments of the invention shown in FIG. 6 as well as in FIGS. 7A–D suitable coupling percentages onto the fast and slow paths are determined by the angle φ between the input polarization vector and the optic axis of the cell/coupler. The following Table 2 shows suitable angles for both symmetric (Case 1) and asymmetric coupling (Cases 2–3) for embodiments of the invention in which each sub-stage includes within a corresponding filter(s) two filter cells and corresponding couplers as shown in FIG. 6.

TABLE 2

| | Input Intensity | 1st Cplr φ | Slow % Fast % | 2nd Cplr φ | Slow % Fast % | 3rd Cplr φ | Slow % Fast % |
|---|---|---|---|---|---|---|---|
| Case 1 Symmetric | 1 | 45° | 50% 50% | −15° | 25% 75% | 0° | 93% 7% |
| Case 2 Asymmetric | 1 | 40° | 59% 41% | −17° | 30% 70% | 0° | 91% 9% |
| Case 3 Asymmetric | 1 | 35° | 67% 33% | −22.5° | 29% 71% | 0° | 85% 15% |

Figure 7A:
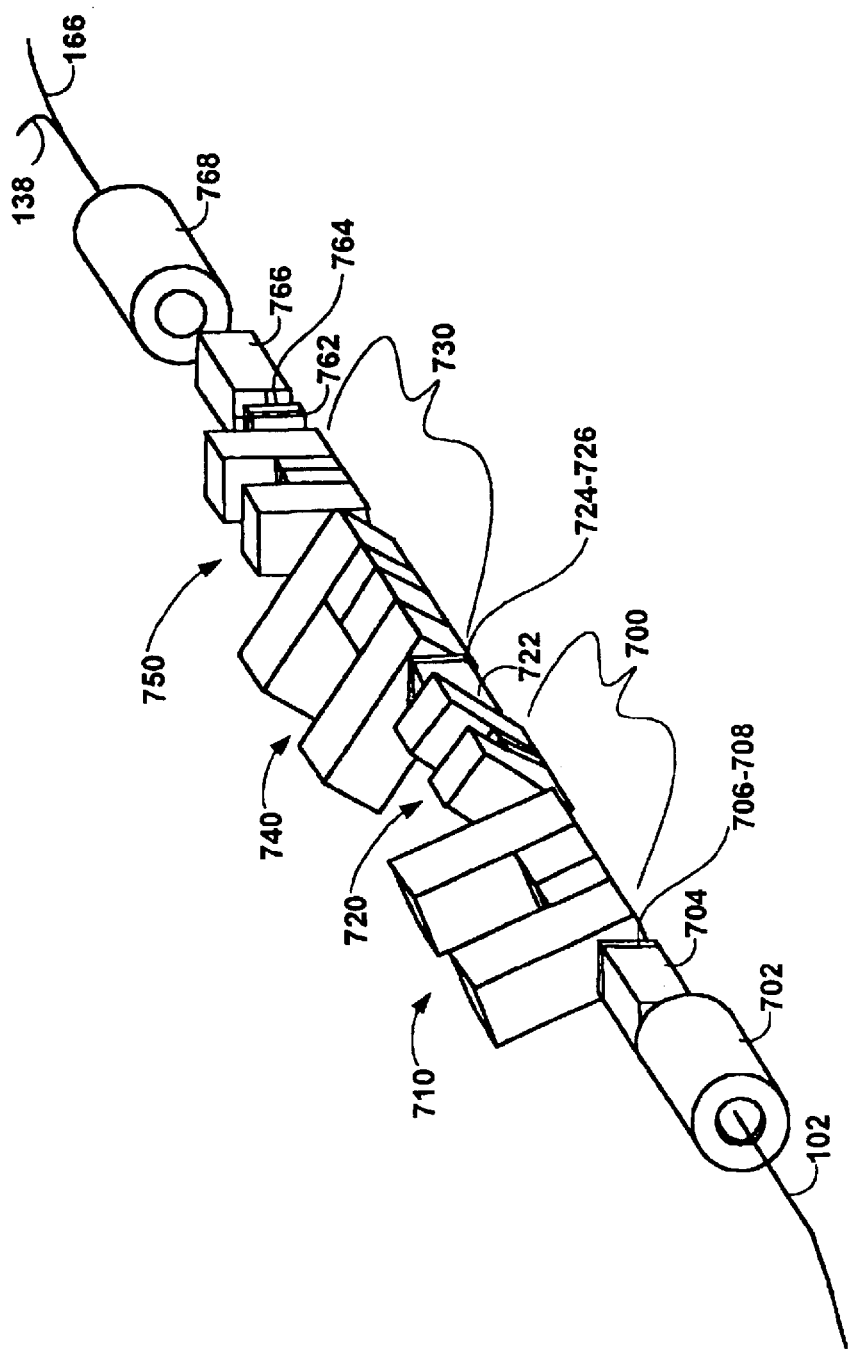
FIG. 7A is an isometric view showing an alternate embodiment of the mux/demux shown in FIG. 6.

FIG. 7A is an isometric view showing an alternate embodiment of the mux/demux shown in FIG. 6. FIGS. 7B–C are top/plan and side/elevation views of the mux/demux. FIG. 7D shows polarization diagrams 776–798 for light propagating through the mux/demux. In this embodiment of the invention the second sub-stage comprises a single filter 730 optically coupled with the polarized outputs of the first sub-stage filter 700.

On the forward/demux path an optical signal 102 may be introduced via an optical fiber into lens 702. Lens 702 may include a Graded Index of Refraction (GRIN) or other lens system. The lens collimates/focuses light depending on the propagation direction from/to the beam splitter 704. The beam splitter may be fabricated from a birefringent crystal with an optic axis oriented to effect a walk-off of the forward beam onto waveplates 706–708. The waveplates are broadband and have optical-axis oriented to effect a linearization of the polarization vectors of the two rays formed by the beam splitter. The linearly polar rays are then introduced into the filter 730 of the first sub-stage 700 and specifically into cell 710 thereof. Cell 710 is, in this embodiment of the invention, fabricated from dielectric polarization dependent couplers on opposite ends of a pair of fast and slow delay paths. The general cell structure for this and subsequent filter cells, 720, 740, 750 is set forth in detail in the following FIGS. 8–9. Light is coupled between filter cell 710 and filter cell 720. The rotation angle φ of the filter cells 710, 720 with respect to the input polarization vector of each of the two rays into which the optical signal has been split determines the coupling of light onto the fast and slow paths of each cell. Odd and even signal components are output by filter cell 720. The passbands for the odd and even channel components at this point correspond with the passbands discussed above in connection with FIGS. 2A, 4A and 4E.

Between the first sub-stage and the second sub-stage a beam splitter 722 and waveplates 724–726 are positioned. The beam splitter splits the odd and even signal outputs from the first sub-stage into component vectors which are then polarized by waveplates 724–726. The component vectors for the odd and even channels are then introduced into the second sub-stage 730 where they will be further isolated. The second sub-stage includes two filter cells 740, 750 serially coupled with one another. One of these cells a.k.a the fundamental cell, as also one of the cells of the first stage, exhibits a free spectral range corresponding with the channel spacing between adjacent odd or even channels. The fundamental cell of the first sub-stage and the second sub-stage diverge from one another in optical pathlength difference by the above discussed amount of ½ λ the incident wavelength. This produces the shift which results in dispersion reduction/compensation. Light propagating from the filter cell 750 of the second sub-stage propagates through an optical bean bender 762 formed from an inclined surface. This has the effect of linearizing the rays as they are presented to the combined waveplates 764 and splitter/combiner 766. The waveplates orthogonalize the odd and even channel components and pass them to the splitter/combiner. On the forward/demux path this results in two arbitrarily polarized beams corresponding with the de-interleaved odd and even channel signal components. These are focused via lens 768 onto optical fiber or other suitable connectors which accept the odd and even channel components 138, 166 respectively.

In the embodiment of the invention shown in FIGS. 7A–D the odd and even channel sets experience the first sub-stage and second sub-stage differently. The fundamental cell, e.g. cell 720, of the first sub-stage 700 operates as a full waveplate to a selected one of an odd channel set and an even channel set and as a half-waveplate to a selected one of the odd set and the even set. Within the fundamental cell, e.g. cell 750 of the second sub-stage 730 the opposite filtration effect is experienced by the odd and even channel sets. The fundamental cell of the second sub-stage operates as a half-waveplate to the selected one of the odd set and the even set and as a full waveplate to the remaining one of the odd set and the even set.

Figure 8A:
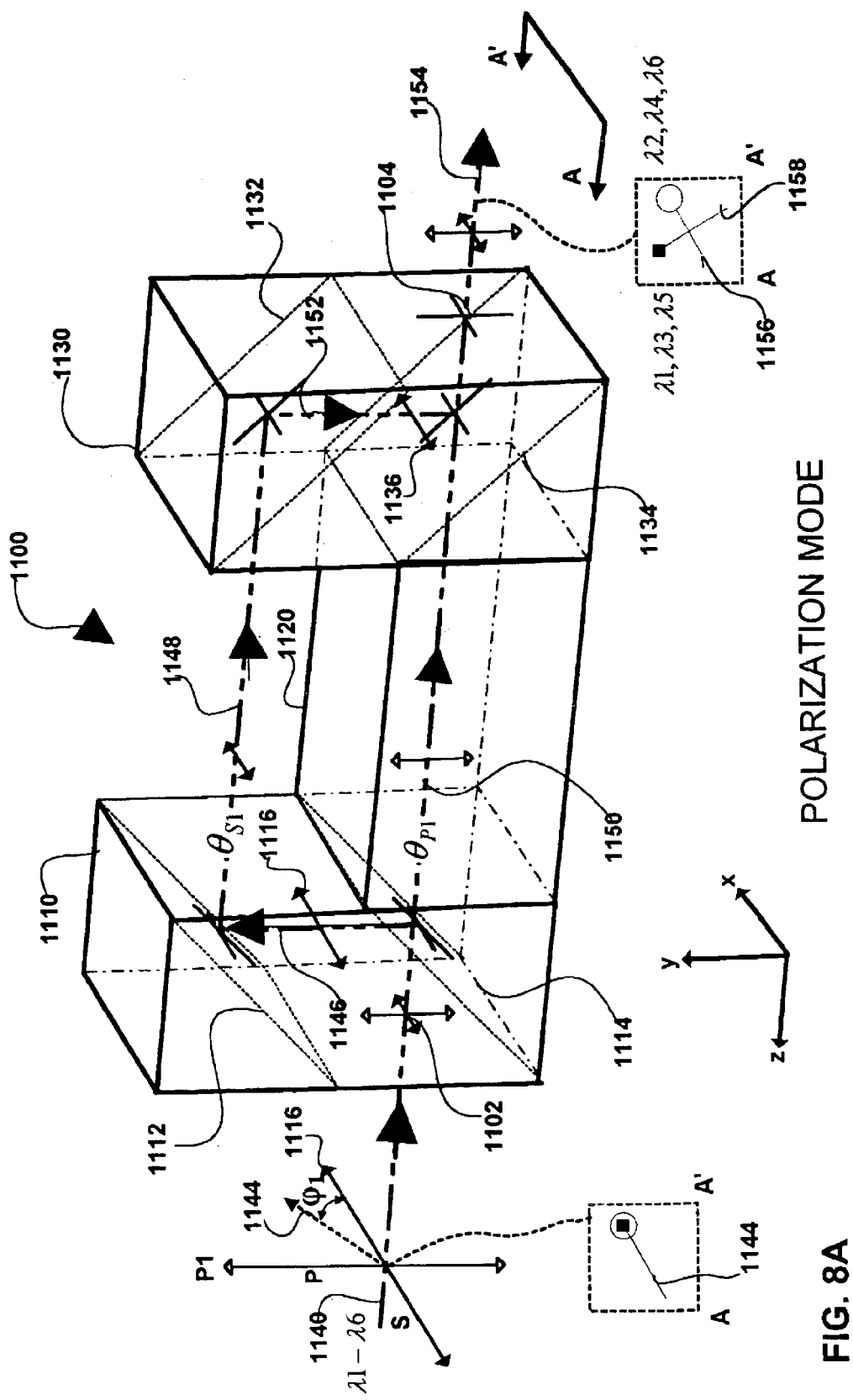
FIG. 8A is an isometric view of an optical filter cell with couplers employing polarization dependent beam splitting linked by a pair of delay paths.

FIG. 8A is an isometric view of an optical filter cell 1100 with couplers employing polarization dependent beam splitting linked by a pair of delay paths 1150 and 1146, 1148, 1152. Each coupler transmits and reflects light depending on the input properties of the light. In the embodiment of the invention shown in FIG. 8A, each coupler is polarization sensitive and includes "P" and "S" polarization axis orthogonal to one another. A first coupler is positioned in the propagation path of incoming polarized light and transmits and reflects components of incoming polarized light aligned with the "P" and "S" polarization axis of the coupler respectively. Light transit and reflected by the coupler follows two distinct delay paths, one for transmitted light and the other for reflected light. Where incoming light is orthogonally polarized, the first coupler provides configurable amounts of coupling and cross-coupling of each of the orthogonal polarization vectors of the incoming light with either of the pair of delay paths. A second coupler positioned at a location where the two distinct delay paths intersect reverses the process and realigns light with orthogonal polarization vectors onto a common propagation axis.

The cell is shown within an "x,y,z" Cartesian coordinate system. The cell includes opposing optical glass blocks 1110, 1130 displaced from one another along the z axis with the optical elements 1120A–B covering the span between the blocks. Optical glass block 1110 is shown with a reflector 1112 and a polarization dependent beam splitter 1114 displaced from each other in a direction defined by the y axis. Optical glass block 1130 is shown with a reflector 1132 and a polarization dependent beam splitter 134 displaced from each other in a direction defined by the y axis. The polarization dependent beam splitters have "S" polarization axes 1116 and 1136 respectively which are aligned with one another and in the orientation of the cell that is shown, also aligned with the x axis. The "P" polarization axis of each polarization dependent beam splitter are orthogonal to the "S" axis. Polarized light input at the first port 1102 will couple with both the P and S axis of the fist coupler 1114, a polarization beam splitter in amounts which corresponded with the relative angular rotation between the polarization vector(s) of the polarized input and the orthogonal P and S polarization axis of the beam splitter. The component of a polarized input which projects onto the S polarization axis of the beam splitter will be reflected by the beam splitter. The component of a polarized input which projects onto the P polarization axis of the beam splitter will be transmitted by the beam splitter. Between the couplers an optical element 1120 is shown.

Each optical glass block 1110, 1130 may in fact be fabricated from two pairs of prism. In the case of block 110 the polarization dependent beam splitter 114 may be formed from a first pair of prisms at right or other complementary angles to one another. These may be affixed to one another, e.g. cemented, to minimize wave front distortion. The hypotenuse of one of the prisms is coated with a multi layer dielectric polarizing beam splitter coating. The prisms are then affixed to one another, to form a first rectangle, the exterior surfaces of which may be antireflection coated (AR) to minimize surface reflection losses. A second pair of prisms may be used to form the reflector 1112. The hypotenuse of one of this second pair of prisms is coated with a reflective dielectric coating, and cemented to the hypotenuse of the other of the second pair of prisms. The hypotenuses of this second pair of prisms are then affixed to one another as well to form a second rectangle, the exterior surfs of which may also be AR coated. The two rectangles formed by the two pairs of prisms may then be affixed to one another to form the glass block 1110. A similar technique may be used to fabricate the second block 130.

The cell couples light bi-directionally between a first port 1102 and a second port 1104 displaced from one another in a direction defined by the z axis. For purposes of illustration, polarized light 1140 is shown entering the cell at the first port and exiting as a polarized output beam 1154 at the second port though the propagation in the opposite direction is also supported. The cell is also highly directional so that light propagating in one direction is independent of the light propagating in the reverse direction. The polarized light beam 1140 may be arbitrarily, circularly or linearly polarized. In the example shown, beam 1140 is linearly polarized with a polarization vector 1144 at an angle $\phi_1$ with respect to the "S" polarization axis 1116 of the cell. As the beam 1140 enters the cell it is accepted onto either of two distinct P and S delay paths 1150 and 1146, 1148, 1152 respectively. These delay paths link the polarization dependent beam splitters 1114, 1134. The amount of light that is coupled onto either delay path is determined by the angle $\phi_1$ of the incoming beam vector with respect to the S polarization axis of the cell. In the example shown, light from polarization vector 1144 in amounts proportionate to $\sin(\phi_1)$ and $\cos(\phi_1)$ will couple to the P and S delay paths respectively. Rotation of the cell about the propagation path, e.g. the z axis, of the beam 1140 can be used to vary the coupling percentages or ratios between the incoming light and the P and S delay paths. Where incoming light includes orthogonal polarization vectors the coupling of either vector will be determined by projecting that vector onto the P and S polarization axis of the polarization beam splitter as well. The polarization beam splitters 1114, 1134 thus serve as couplers which provide configurable amounts of coupling and cross-coupling of incoming beams with either of the pair of delay paths.

The amount of delay on the P and S delay paths are $\theta_{P1}$ and $\theta_{S1}$ respectively. The delay of each path is determined by its corresponding optical path length. The optical path length of each path is the sum of the product of physical dimension and the index of refraction of all the optical elements on each of the two distinct P and S delay paths 1150 and 1146, 1148, 1152 respectively. The delay difference for the cell is proportional to the difference in the optical path lengths between the P and S delay paths. The delay difference exhibits itself in the optical properties of the output beam 1154. That output beam exhibits the interference pattern produced by the re-coupling of the P and S delay paths by the second of the polarization beam splitters 1134 into a single output beam. The output beam includes orthogonal polarization vectors 156–1158. Each contains complementary periodic stop bands and pass bands of the other with center wavelengths the spacing between which is inversely related to the delay difference between the P and S delay paths. In other words the larger the delay difference the smaller the wavelength spacing which the optical filter cell can resolve. The first vector 1156 contains pass bands with center wavelengths at even integer multiples of the periodic interval-established by the delay difference. The second vector 1158 contains pass bands with center wavelengths at odd integer multiples of the periodic interval established by the delay difference.

The cell nay be provided with an appropriate lens, e.g. a GRIN lens or other suitable lens, and a linear polarizer coupled to the first port to linearly polarize arbitrarily polarized incoming light and to direct it to the first port. At the opposite end, a beam displacer/combiner may be coupled with the second port to displace and combine orthogonally polarized odd and even channel components 1156–1158 of an optical beam depending on the propagation direction of the light beam. An appropriate lens(es), e.g. GRIN, may also be added at this end to focus and collimate the light from the beam displacer/combiner depending on the propagation direction. The resultant system may serve as either or both a multiplexer or a demultiplexer depending on a propagation direction of the light.

In an alternate embodiment of the invention there may be a single reflector replacing reflectors 1112 and 1130 to bend the S delay path between the two polarization beam splitters 1114 and 1134. In still another embodiment additional reflectors may be added.

In an alternate embodiment of the invention an opposing pair of back-to-back birefringent crystals may be used instead of the polarization beam splitters to split incoming light into an "e" and an "o" ray delay path corresponding with "S" and "P" delay paths respectively. The principal planes of the pair of crystals would be aligned in a common plane with the optical axis of each birefringent crystal at substantially complementary angles to one another so as to cause a splitting and recombining of the e and o ray delay paths.

FIG. 8B is an isometric view of an optical filter cell 1106 with couplers employing intensity dependent beam splitting linked by a pair of delay paths 1170 and 1166, 1168, 1172. This cell is also shown within an. "x,y,z" Cartesian coordinate system. The cell includes many of the features of the cell shown in FIG. 8A with the exception that the coupling function is here performed by partial reflectors 1164, 1174 which form intensity beam splitters. The cell includes opposing optical glass blocks 1110, 1130 displaced from one another along the z axis with the optical element 1120 covering the span between the blocks. Optical glass block 1110 is shown with a reflector 1112 and the intensity beam splitter 1164 displaced from each other in a direction defined by the y axis. Optical glass block 1130 is shown with a reflector 1132 and an intensity beam splitter 1174 displaced from each other in a direction defined by the y axis. Between the couplers an optical element 1120 is shown.

Each optical glass block may in fact be fabricated from two pairs of prisms. In the case of block 1110 the intensity beam splitter 1164 may be formed from a first pair of prisms at right or other complementary angles to one another, which are cemented together to minimize wave front distortion. The hypotenuse of one of the prisms is coated with a multi layer dielectric beam splitter coating which exhibits configurable amounts of transmission and reflection of an incident beam. The prisms are then affixed to one another, e.g. cemented together, to form a first rectangle, the exterior surfaces of which may be antireflection coated (AR) to minimize surface reflection losses. A second pair of prisms may be used to form the reflector 1112. The hypotenuse of one of this second pair of prisms is coated with a reflective dielectric coating, and affixed to the hypotenuse of the other of the second pair of prisms. The hypotenuses of this second pair of prisms are then affixed to one another as well to form a second rectangle, the exterior surfaces of which may also be AR coated. The two rectangles formed by the two pairs of prisms may then be affixed to one another to form the glass block 1110. A similar technique may be used to fabricate the second block 1130.

The cell 1102 couples light bi-directionally between first/second ports 1180–1182 and the third/fourth ports 1184–1186. For purposes of illustration optical beams 1160–1162 are shown entering the cell at the first and second ports 1180–1182 respectively and exiting the cell as beams 1178–1176 at the third and fourth ports 1184–1186 respectively. Propagation in the opposite direction is also supported. The cell is also highly directional so that light propagating in one direction is independent of the light propagating in the reverse direction. In the example shown, beam 1160 enters the cell at port 1180 and beam 1162 enters the cell at port 1182. Each beam is accepted onto either of two distinct transmission ($T_1$) and reflection ($R_1$) delay paths 1170 and 1166, 1168, 1172 respectively. These delay paths link the intensity beam splitters 1164, 1174. The amount of light that is coupled from the inputs at ports 1180 and 1182 onto either delay path by each beam is determined by the beam path and the ratio or percentage of transmission and reflection of the beam splitter 1164. The amount of light that is coupled from the either delay path to the output at ports 1184 and 1186 is determined by the beam path and the ratio or percentage of transmission and reflection of the beam splitter 1174. The percentage of transmission and reflection is an optical property that can be precisely specified. The intensity beam splitters 1164, 1174 thus serve as couplers which provide configurable amounts of coupling and cross-coupling of incoming beams with either of the pair of delay paths.

The amount of delay on the $T_1$ and $R_1$ delay paths 1170 and 1166, 1168, 1172 are $\theta_{r1}$ and $\theta_{R1}$ respectively. The delay of each path is determined by its corresponding optical path length. The optical path length of each path is the sum of product of the physical dimension and the index of refraction of all the optical elements on each of the two distinct delay paths. The delay difference for the cell is proportional to the difference in the optical path lengths between the $R_1$ and $T_1$ delay paths. The delay difference exhibits itself in the optical properties of the output beam 1176–1178. The output beams exhibit an interference pattern produced by the re-coupling of the $R_1$ and $T_1$ delay paths by the second of the beam splitters 1174. Each output beam contains complementary periodic stop bands and pass bands of the other with center wavelengths the spacing between which is inversely related to the delay difference between the $R_1$ and $T_1$ delay paths. In other words the larger the delay difference the smaller the wavelength spacing which the optical filter cell can resolve. Output beam 1176 contains pass bands with center wavelengths at even integer multiples of the periodic interval established by the delay difference. Output beam 1178 contains pass bands with center wavelengths at odd integer multiples of the periodic interval established by the delay difference.

The single cell 1102 nay serve as either or both a multiplexer or a demultiplexer depending on a propagation direction of the light.

For each of the optical filters discussed above it may be necessary to adjust the center wavelength and free spectral range of any given cell or set of delay paths. This can be accomplished by tilting of the cell about the x axis normal to the propagation path, or by tilting each of the component within the cell resulting a net change of effective optical path length difference. This will allow a coarse tuning to the appropriate free spectral range followed by a shifting, i.e. a fine tuning, of the center wavelength of all the pass bands generated by each cell or delay path.

Figure 8C:
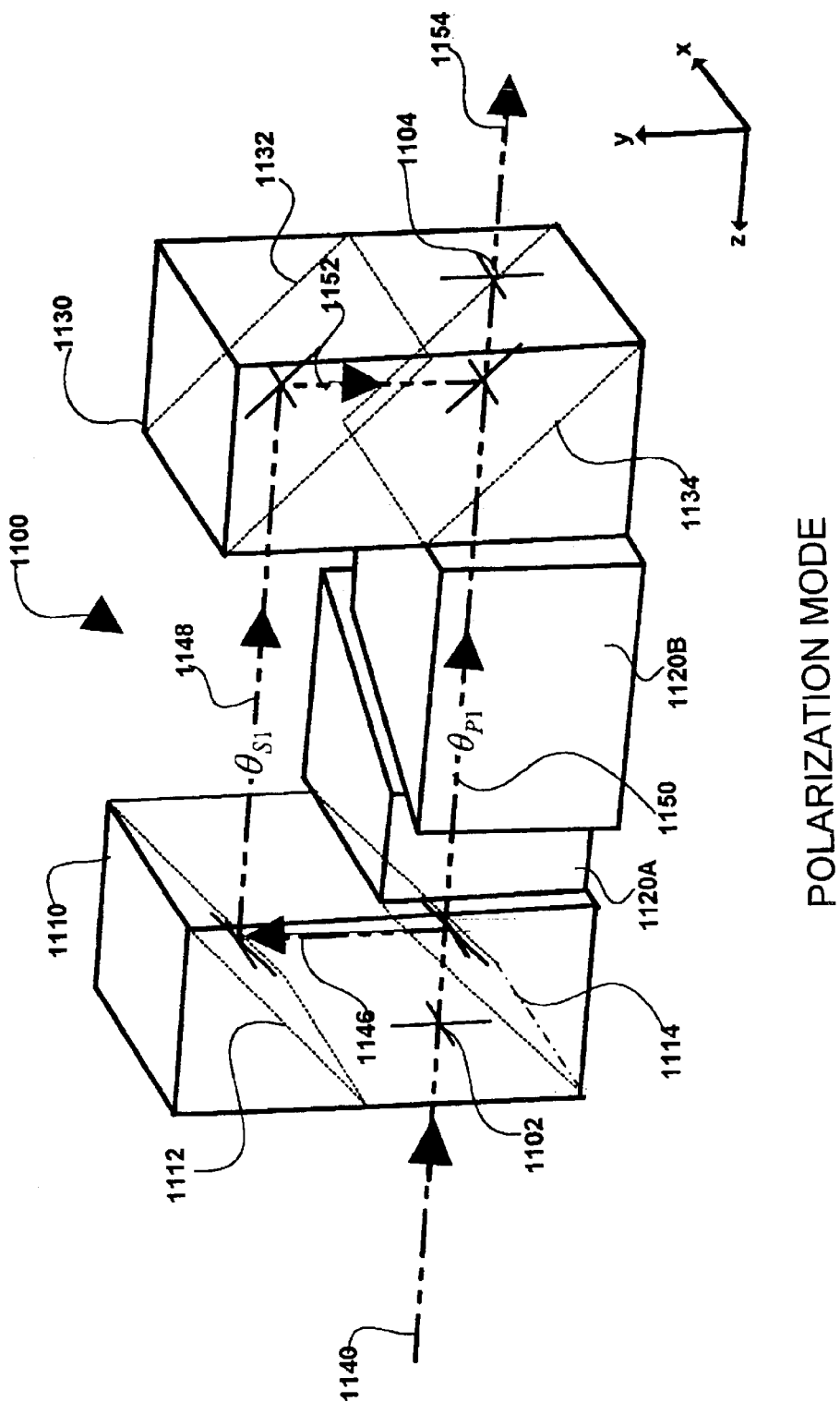
FIG. 8C is an isometric view of an optical filter cell shown in FIG. 8A with one of the optical elements configured for adjustment of the center wavelength and free spectral range of the filter.

FIG. 8C is an isometric view of an optical filter cell shown in FIG. 8A with one of the optical elements, i.e. element 1120AB, configured for adjustment of the center wavelength and free spectral range of the filter. Optical element 1120AB is shown is cleaved into a pair of complementary wedges 1120A and 120B. As each wedge is moved in opposing directions along the x axis the optical path length of delay path 1150 is altered. This results in a shift in the center wavelength and a change in the free spectral range of the cell. Once the cell exhibits the desired center wavelength the wedges 1120A, 1120B are fixed relative to the blocks 1120 and 1130.

FIG. 8D is an isometric view of an optical filter cell shown in FIG. 5B with one of the optical elements configured for adjustment the center wavelength and free spectral range of the filter and with an alternate coupler configuration. As discussed above in connection with FIG. 8C the cleaving of element 1120 into wedges 1120A and 1120B provides a means for shifting the center wavelength and adjusting the free spectral range of the cell.

FIG. 8D also introduces an alternate configuration for the blocks 1110 and 1130 shown in FIGS. 8A–B. This alternate block configuration is shown in the context of intensity dependent beam splitting as introduced in FIG. 8B, and may be applied with equal advantage to the polarization dependent beam splitting shown in FIG. 8A. The couplers 1164, 1174 are defined on the corresponding external base faces of a pair of opposing blocks 1188 and 1190. Each block 1188, 1190 is configured with an upper angular portion on the corresponding external surfaces of which the reflectors 1112, 1132 respectively are defined.

Figure 8E:
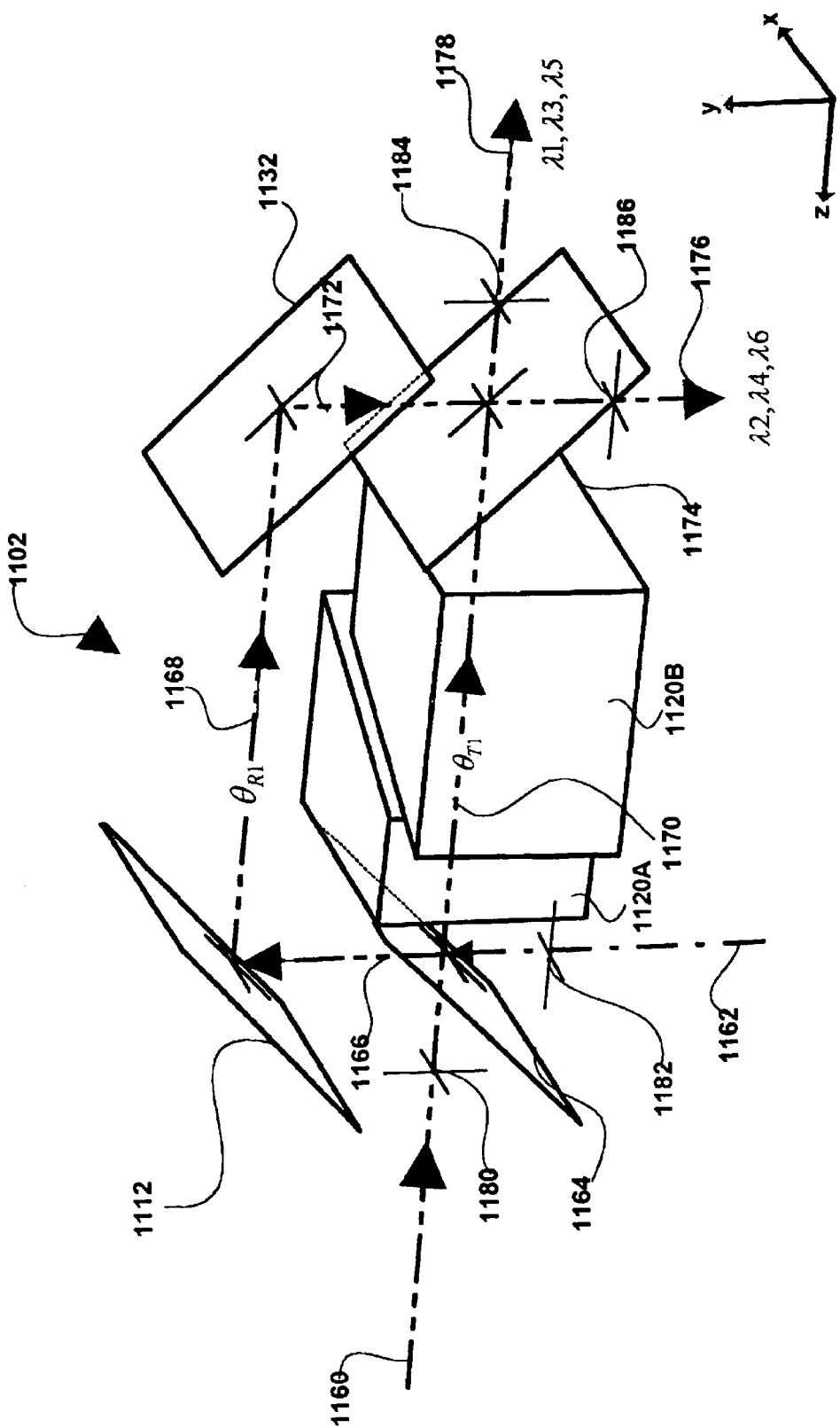
FIG. 8E is an isometric view of an optical filter cell shown in FIG. 8B with one of the optical elements configured for adjustment of the center wavelength and free spectral range of the filter and with an alternate coupler configuration.

FIG. 8E is an isometric view of an optical filter cell shown in FIG. 8B with one of the optical elements configured for adjustment of the center wavelength and free spectral range of the filter and with an alternate coupler configuration. As discussed above in connection with FIG. 8C the cleaving of element 1120 into wedges 1120A and 1120B provides a means for shifting the center wavelength and adjusting the free spectral range of the cell.

FIG. 8E also introduces still another configuration for the blocks 1110 and 1130 shown in FIGS. 8A–B. This alternate block configuration is also shown in the context of intensity dependent beam splitting as introduced in FIG. 8B, and may be applied with equal advantage to the polarization dependent beam splitting shown in FIG. 8A. In this embodiment of the invention the block structure is dispensed with and each coupler 1164, 1174 is defined on its own discrete substrate. Suitable substrates include any suitable transparent medium e.g. optical glass or a semiconductor. Similarly, reflectors 1112 and 1132 are rennin on their own discrete substrate, which in this case does not need to be transparent. Each coupler and reflector is positioned with respect to one another by a suitably stable frame, not shown.

Figures 9A, 9B:
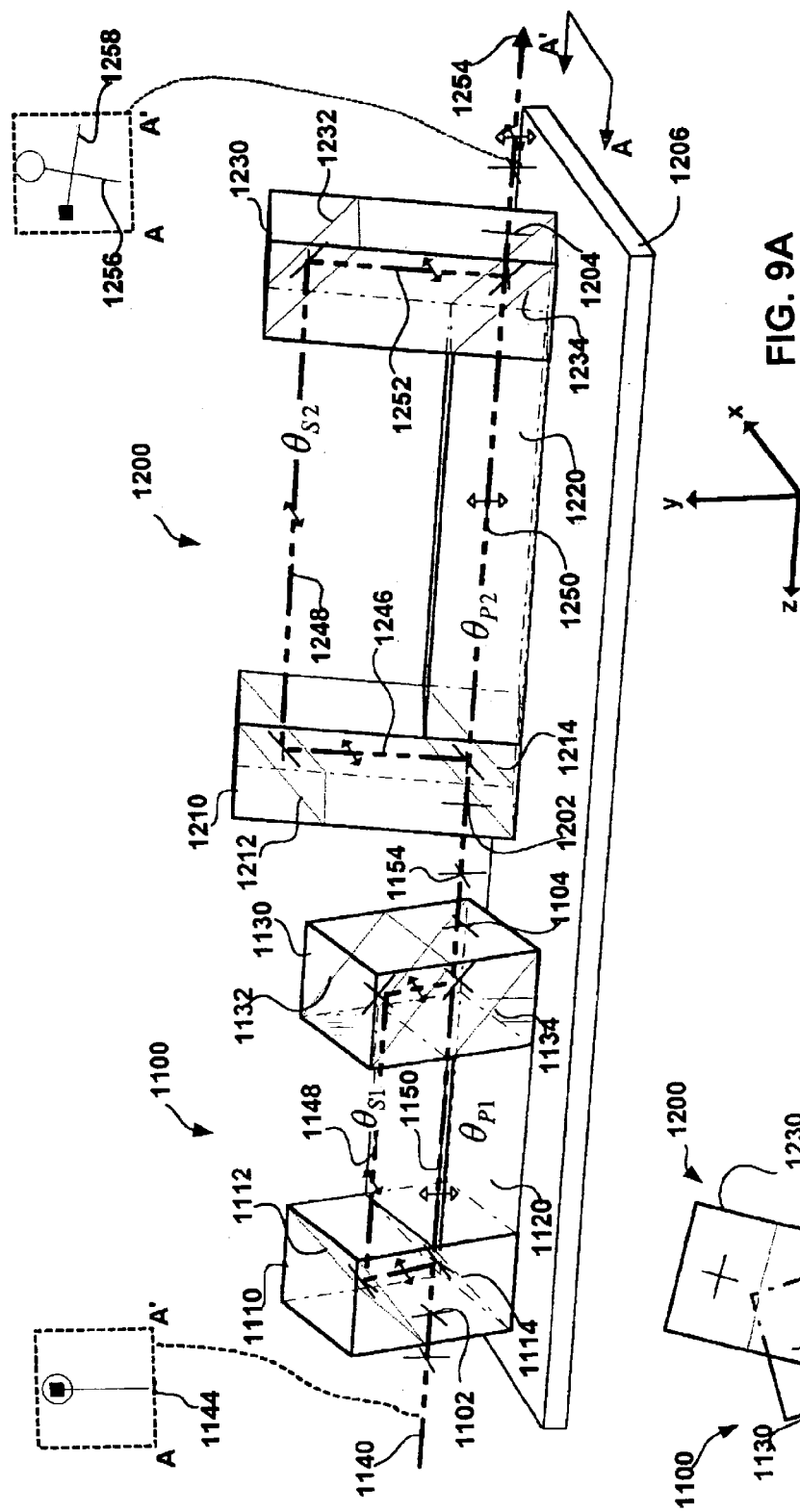
FIGS. 9A–B are isometric and end views respectively of a multi cell implementation of the optical filter cell shown in FIG. 8A.

FIGS. 9A–B are isometric and end views respectively of a multi-cell implementation of the optical filter cell shown in FIG. 8A. Two cells 1100 and 1200 are shown coupled serially to one another in sequence. This concept of serially coupling cells allows an optical filter to exhibit a more complex transfer function than the simple sinusoidal output provided by the single cell shown in FIG. 8A. In this example the delay paths provided by cell 1200 and their delay difference are larger than the delay paths and delay difference provided by the cell 1100. This result can be achieved either by fabricating cell 1200 from the same optical elements as cell 100 with an increase in the physical length of the elements or by fabricating cell 1200 from optical elements with higher indices of refraction than those of cell 100 thus maintaining the same form factor for both cells.

The combination of first cell and subsequent cells can be looked at as establishing by the difference between their delay paths the fundamental sinusoidal harmonic for the sequence and higher order harmonics. In an embodiment of the invention this objective is achieved by designing one of the cells in the sequence with a FSR corresponding with the desired fundamental harmonic and with others of the cells designed with FSRs which are integer fractions of the base FSR. The coefficients or amplitude of each harmonic are provided by varying the coupling ratio/percentage/coefficients between a polarized input to a cell and the P and S polarization axes of the cell as provided by the corresponding polarization beam splitter. The coupling coefficients are varied by tilting of a cell about the propagation path of a polarized input to each cell.

Cell 1100 includes the components described above in connection with FIG. 8A. Cell 1200 includes couplers 1214, 1234 employing polarization dependent beam splitting linked by a pair of delay paths 1250 and 1246, 1248, 1252. The cell 1200 includes opposing optical glass blocks 1210, 1230 displaced from one another along the z axis with the optical element 1220 covering the span between the blocks. Optical glass block 1210 is shown with a reflector 1212 and a polarization dependent beam splitter 1214 displaced from each other in a direction defined by the y axis. Optical glass block 1230 is shown with a reflector 1232 and a polarization dependent beam splitter 1234 displaced from each other in a direction defined by the y axis. The polarization dependent beam splitters have "S" polarization axis which are aligned with one another. Between the couplers an optical element 1220 is shown. The various components are shown on top of base 1206.

Polarized beam 1140 has, in the example shown, a linearly polarized input with a vector 1144. This beam enters the cell 1100 at the first port 1102, is reflected and transmitted by polarization beam splitter 1114 onto one end of the pair of delay paths $\theta_{S1}$ and $\theta_{P1}$. At the opposite end of the delay paths reflection and transmission by the polarization beam splitter 1134 produces a common output beam 1154 which exits the cell 1100 at port 1104. Port 1104 of the first cell couples with port 1202 of the next cell 1200 in the sequence. Thus, the beam 1154 output from the first cell enters the second cell 1200 where it is reflected and transmitted by polarization beam splitter 1214 onto one end of the pair of delay paths $\theta_{S2}$ and $\theta_{P2}$. At the opposite end of the delay paths reflection and transmission by the polarization beam splitter 1234 produces a common output beam 1254 which exits the cell 1200 at port 1204, with orthogonal polarization vectors 1256–1258 with odd and even components, respectively. The process can be repeated to form a longer sequence of cells and a more complex optical filter transfer function.

Figure 9C:
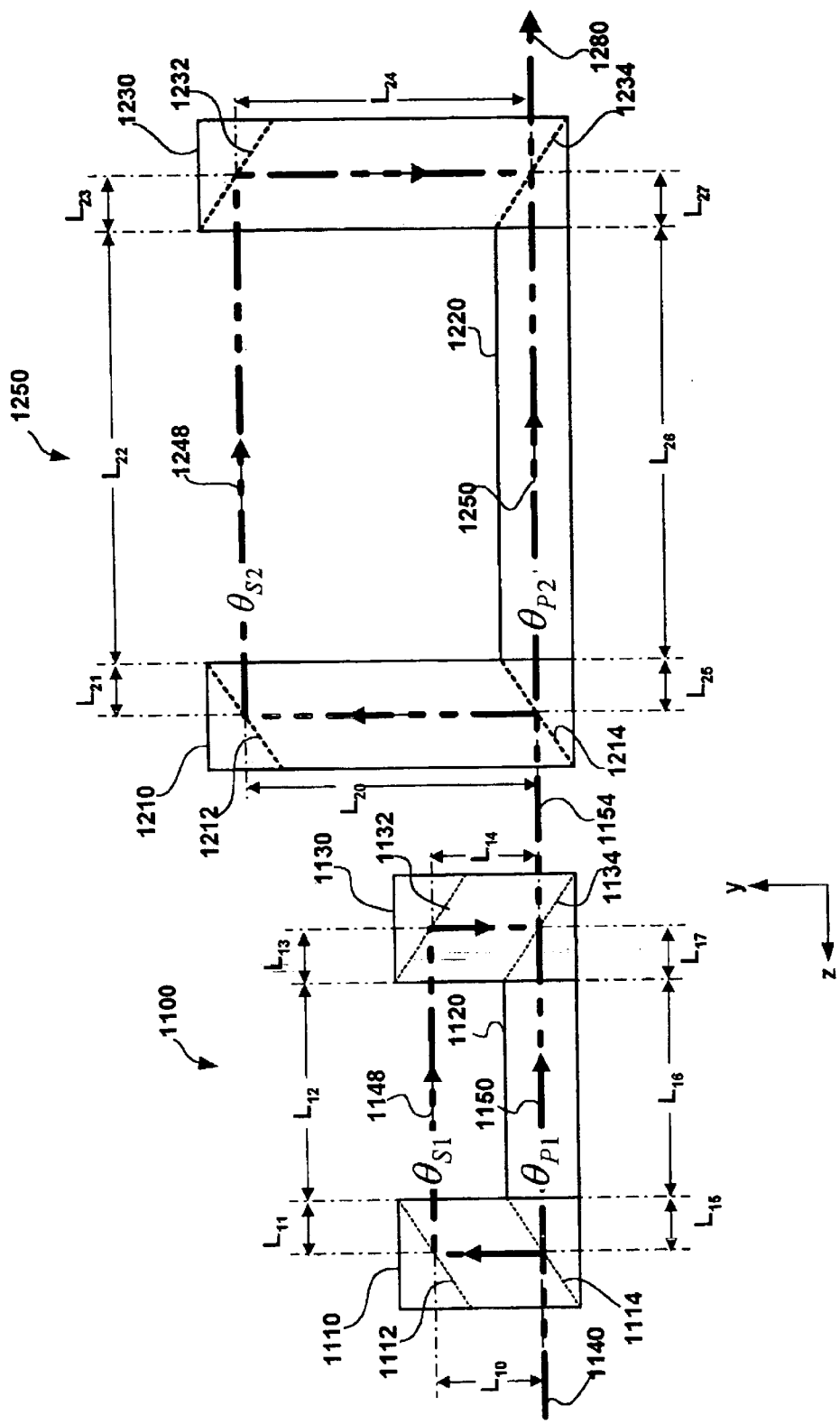
FIG. 9C is a side elevation view of the delay paths of the multi-cell implementation shown in FIGS. 9A–B.

FIG. 9C is a side elevation view of the delay paths of the multi-cell implementation shown in FIGS. 9A–B. The delay introduced into light passing along any delay path is a function of the optical pa length of the optical elements which comprise the delay path. Optical path length "L" of an optical element is expressed as the product of the physical distance "d" traversed by a beam propagating through the element multiplied by the index of refraction "n" the element. Where multiple optical elements are involved the individual contributions to the optical path length from the individual elements are summed. For purposes of the current invention optical elements include: a vacuum a gas, a liquid, a solid or a plasma along the propagation path. The index of refraction of a medium identifies ratio of the speed of light in a vacuum to that of light in the medium. Where the optical path length varies as here between two delay paths one path is said to be faster/slower than the other and there is said to be a delay difference between the two.

Beam 1140 propagates through the first cell 1100 across delay paths $\theta_{P1}$ and $\theta_{S1}$ and through the second cell 1250 across delay paths $\theta_{P2}$ and $\theta_{S2}$. Delay path $\theta_{P1}$ comprises optical elements defined by optical path length $L_{15}$–$L_{17}$. Delay path $\theta_{S1}$ comprises optical elements defined by optical path lengths $L_{10}$–$L_{14}$. Delay path $\theta_{P2}$ comprises optical elements defined by optical path length $L_{25}$–$L_{27}$. Delay path $\theta_{S2}$ comprises optical elements defined by optical path lengths $L_{20}$–$L_{24}$. In the embodiment shown the optical elements defined by optical path lengths $L_{12}$–$L_{22}$ include air/gas/vacuum. The remaining optical elements may be fabricated from various types of optical glass including: BKx, fused silica, SFx. By proper design of delay paths the fundamental and higher order harmonics for the optical filter may be established.

The delay for the delay paths $\theta_{P1}$ and $\theta_{S1}$ in the first filter 1100 are expressed as a function of the optical path lengths of each path in the follow Equations 4–5 respectively.

$$\theta_{SI} = \left(2\pi\frac{v}{c}\right)\left(\sum_{i=1}^{i=I} d_i n_i\right) \quad \text{Equation 4}$$

$$\theta_{PI} = \left(2\pi\frac{v}{c}\right)\left(\sum_{j=1}^{j=J} d_j n_j\right) \quad \text{Equation 5}$$

where c and v are the frequency and velocity of light in free space and where I and J are the number of optical elements which make up the delay paths with delays $\theta_{S1}$ and $\theta_{P1}$ respectively. For each of the I optical elements: vacuum, gas, plasma, liquid or solid which make up the delay path $\theta_{S1}$ the $i^{th}$ element has a physical length $d_i$ and an index of refraction $n_i$. For each of the J optical elements: vacuum, gas, plasma, liquid or solid which make up the delay path $\theta_{P1}$ the $j^{th}$ element has a physical length $d_j$ and an index of refraction $n_j$. Optical elements include the optical coatings associated with polarization or intensity dependent beam splitters, which also contribute to optical pathlength and phase accumulations.

The delay difference between the two paths is expressed in Equation 6.

$$\theta_{SI} - \theta_{PI} = \left(2\pi\frac{v}{c}\right)\left(\sum_{i=1}^{i=I} d_i n_i - \left(\sum_{j=1}^{j=J} d_j n_j\right)\right) \quad \text{Equation 6}$$

The delay difference for the cell is proportional to the difference in the optical path lengths between the S and P delay paths. Similar considerations apply in determining the delays and delay differences for the pair of delay paths in the second cell 1200.

The optical p length difference between the two delay paths in a cell, corresponds inversely with the free spectral range (FSR) generated by the cell as evidenced in the orthogonal vector components of the output beam from the cell. This relationship is set forth in the following Equation 7.

$$FSR = \left(\frac{c}{|L_I - L_J|}\right) = \left(\frac{c}{\left|\sum_{i=1}^{i=I} d_i n_i - \sum_{j=1}^{j=J} d_j n_j\right|}\right) = 2\pi\frac{v}{(\theta_s - \theta_p)} \quad \text{Equation 7}$$

where $L_I$ and $L_J$ are the total optical path length of the I and J elements which make up the corresponding delay paths $\theta_{S1}$, and $\theta_{P1}$.

For an optical mux/demux the FSR should be a constant perhaps equal to the channel spacing, e.g., 100 GHz. Using Equation 7 the delay difference required to generate this result can be determined, and from it a solution to the optical path lengths for each of the delay paths.

Figures 9D, 9E:
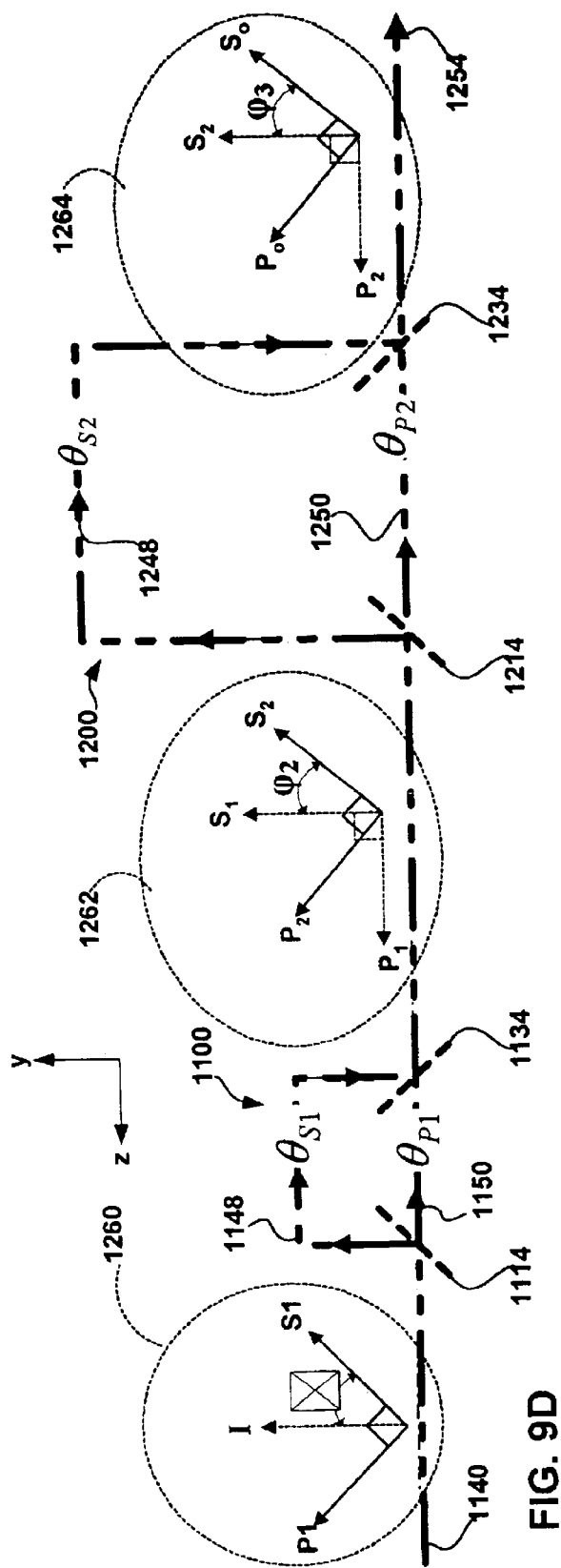
FIG. 9D is a side elevation view of the variable coupling between cells of the multi cell implementation shown in FIGS. 9A–B.
FIG. 9E shows the individual transforms associated with each of the four delay paths through the two cell sequence shown in FIG. 9A

FIG. 9D is a side elevation view of the variable coupling between cells of the multi-cell implementation shown in FIGS. 9A–B. Coupling is used to control the amount an input of polarized light that will be projected onto the S and P delay paths of a corresponding cell. Three coupling views 1260, 1262 and 1264 are shown at appropriate locations at the input to cell 1100, the interface between cells 1100 and 1200 and at the output of cell 1200 respectively. The three views 1260–1264 are from the output port 1204 looking back along the propagation path of the input beam 1140. In the first of the coupling views 1260, the polarized input is shown with a single input vector "I" and the orthogonal polarization axis P1 and S1 of the first cell 1100 are shown. The input I may include orthogonal input vectors. The amount of light that is coupled onto either delay path in the first cell is determined by the angle $\phi_1$ of the incoming beam vector with the S polarization axis of the cell. In the example shown light from polarization vector 1144 in amounts proportionate to $\sin(\phi_1)$ and $\cos(\phi_1)$ will couple to the P and S delay paths respectively. Rotation of the cell about the propagation path of the bean 1140 can be used to vary the coupling percentages or ratios between the incoming light and the P and S delay paths. In the next coupling view 1262, light from the output port of cell 1100 is coupled with the input port of cell 1200. The orthogonal polarization vectors $P_1$, $S_1$ present in the output of the first cell are shown along with the orthogonal polarization vectors $P_2$, $S_2$ which are defined by the coupler of the next cell in the sequence, i.e. cell 1200. The amount of light that is coupled onto either delay path in the second cell is determined by the angle $\phi_1$ between the two sets of orthogonal vectors for the input and the cell 1200. The last coupling view 1264, shows the orthogonal polarization vectors, $P_2$, $S_2$ present in the output of the second cell along with a second set of orthogonal polarization vectors $P_o$, $S_o$. This last orthogonal vector set is used to represent output optics used to separate the orthogonal vectors within the single output beam into two discrete beams (not shown). The amount of light coupled onto the output beams is defined by an angle $\phi_3$ between the two sets of orthogonal vectors.

FIG. 9E shows the individual transforms 1288 associated with each of the four distinct delay paths from the input port 1102 to the output port 1204. The number of discrete paths in a multi-cell sequence of N cells with two delay paths between each equals $2^N$. For two cells there are $2^1$ or 4 discrete paths between an input and an output. The first of these paths is along delay paths $\theta_{S1}$ and $\theta_{S2}$ in the fit cell 1100 and the second cell 1200 respectively. The second of these paths is along delay paths $\theta_{S1}$ and $\theta_{P2}$. The third of these paths is along delay paths $\theta_{P1}$ and $\theta_{S2}$. The fourth of these paths is along delay paths $\theta_{P1}$ and $\theta_{P2}$. The transfer function for the optical filter in single or sequential cell embodiments is the sum of the individual transfer functions associated with each discrete path from input to output. Transfer functions: 1288, 1290, 1292, 1294 are shown for the $1^{st}$ to 4 th paths discussed above. Each transfer function includes two terms 1296–1298. The first term 1296 corresponds to a coefficient in a Fourier series with the coefficient magnitude proportional to the product of the coupling or cross coupling coefficients along the particular path. The second term 1298 corresponds to the frequency component associated with that coefficient. The frequency component corresponds with the sum of the delays along a corresponding path. This in turn corresponds with the optical path lengths along each path. The sum of all the transfer functions forms a truncated Fourier series which fully defines the optical filter.

In an embodiment of the invention a multi-cell design includes: a first cell of 100 GHz FSR and a $2^{nd}$ cell of 50 GHz FSR can be used to form a polarization type square top comb filters. This filter can split an optical stream with 50 GHz channel spacing into two separate optical stream with odd and even 100 GHz charnel spacing respectively or combining two optical stream with 100 GHz odd and even channel spacing respectively into an optical stream with 50 GHz channel spacing. The $1^{st}$ angle $\phi_1$ can substantially equal to 45 degree and 2nd angle $\phi_2$ can substantially equal to (45+22.5) degree. Similarly, a fist cell of 100 GHz FSR and a cell of 50 GHz FSR can be used to form a intensity type of square top comb filters. The $1^{st}$ splitting ratio equals substantially to 50/50% and the $2^{nd}$ splitting ratio equals $\text{Cos}^2(45+22.5°)/\text{Sin}^2(45+22.5°)$. In still another embodiment of the invention a first stage with a plurality of cells and a second stage with a plurality of cells can be coupled together to further clean up the signal. In a multi-cell embodiment a square top filter function may be achieved by choosing one cell with the base FSR and with the FSRs of the remaining cells standing in relation to the FSR of the base cell as integer fractional multiples thereof.

Further teachings on sequentially coupled optical filter cells may be found in either of the two following references. See S. E. Harris et al., *Optical Network Synthesis Using Birefringent Crystals*. JOURNAL OF THE OPTICAL SOCIETY OF AMERICA, VOLUME 54, Number 10, October 1964 for a general discussion of transfer functions related to birefringent crystals, which is hereby incorporated by reference as if fully set forth herein. See C. R Henry et al. U.S. Pat. No. 5,596,661 entitled *"Monolithic Optical Waveguide Filters based on Fourier Expansion"* issued on Jan. 21, 1997 for a general discussion of transfer functions related to waveguides, which is hereby incorporated by reference as if fully set forth herein.

Passive Thermal Stabilization

The typical application of optical filters constructed using the above techniques is an optical mux/demux In order for that device to function properly it must create the desired stop bands and pass bands for the odd and even channels which it separates. For current telecommunication applications the filter would be designed with a constant FSR perhaps equal to the channel spacing, e.g., 100 GHz. An optical filter with this FSR would generate the required stop bands and pass bands in each of the orthogonal polarization vectors present on the output. One of the orthogonal output vectors would contain the pass bands associated with the center wavelengths of the odd channels. The other of the orthogonal output vectors would contain the pass bands associated with the center wavelengths of the even channels.

Temperature variations in a mux/demux that may effect the performance may result from the environment or from the power transmitted through the device. This can result in the periodic odd and even pass bands generated by the optical filter moving out of alignment with the selected grid, e.g., the ITU grid. This is primarily because the center wavelength of a pass band slips with temperature. This misalignment results in attenuation of signal strength, cross talk and ultimately loss of transmission/reception capability until the optical filter returns to its original temperature. In practice therefore, the optical filters and devices fabricated therefrom must be thermally stable across a rage of temperatures.

One solution is to flatten the pass bands of the filter. Multi cell filter designs such as those discussed above allow the pass bands to exhibit higher order harmonics in the form of non-sinusoidal pass band profiles, a.k.a "flat tops" (See FIG. 11). The close spacing between the channels in a WDM, makes it desirable to design a WDM with flat pass bands in order to increase the error tolerance to temperature induced shifts in the pass bands. Even with flat top filter profiles temperature stabilization is still required due to the precise telecommunication channel spacing.

One solution is to actively stabilize the temperature of the multiplexer/de-multiplexer using a heater or cooler and a dosed loop feedback of temperature or wavelength. This solution can be expensive and any increase the form factor of the mux/demux. Nevertheless, the current invention may be practiced with active temperature stabilization. A possible benefit to active temperature stabilization is that the optical elements which nuke up each pair of delay paths may all be fabricated from a common medium with identical indices of refraction and thermal expansion coefficient.

Although capable of being utilized in systems with active temperature stabilization, the current invention is capable of providing temperature stability for the optical filters without active temperature control where appropriate. This greatly enhances the precision of the devices or systems fabricated therefrom and reduces system cost. The current invention is capable of providing passive temperature stabilization of an optical device, through proper selection and design of the optical elements which form each pair of delay paths so that the delay difference for each pair of delay paths and hence the system as a whole remain constant. Since the delay difference is directly related to the difference in the optical path lengths this invention provides thermal stabilization of the delay difference. As opposed to prior art design that use a single medium for each pair of delay p, the current invention provides at least one of the delay paths with two optical elements each of which exhibits a different optical path length response to temperature. Typically this takes the form of optical elements with different thermal optic coeffients.

The system is designed so that $d(L_I - L_J)/dT$ equals substantially zero. This latter condition is satisfied when the derivative of the denominator in Equation 7 substantially equals zero as set forth in the following Equation 8:

$$\frac{d(L_I - L_J)}{dT} = \frac{d\left(\sum_{i=1}^{i=I} d_i n_i - \sum_{j=1}^{j=J} d_j n_j\right)}{dT} = \sum_{i=1}^{i=I}(d_i \beta_i + \alpha_i n_i d_i) - \sum_{j=1}^{j=J}(d_j \beta_j + \alpha_j n_j d_j) \approx 0$$

Equation 8 where $a_i$ and $a_4$ are the thermal expansion coefficients for each optical element which form the S and P delay paths respective in each cell and where $\beta_i$ and $\beta_j$ are the thermal optic coefficients for the temperature induced change in the refractive index for each element in the S and P delay paths respectively.

The following Table 3 shows various relevant optical parameters for some optical mediums which may be used to fabricate the optical elements which make up each pair of delay paths.

TABLE 3

| 1 | @1550 nm | vacuum | Air | BK7 | SF5 | Fused Silica | BaK1 | LaSFN30 |
|---|---|---|---|---|---|---|---|---|
| 2 | n | 1 | 1.00027 | 1.50066 | 1.64329 | 1.44409 | 1.55517 | 1.77448 |
| 3 | $\beta = \frac{dn}{dT} \times 10^{-6}$ | 0 | 0* | 0.907465 | 1.407 | 13.7 | 0.066 | 2.293 |
| 4 | $\alpha \times 10^{-6}$ | 0 | 0* | 5.1 | 8.2 | 0.52 | 7.6 | 6.2 |

*assuming constant volume

For each material its refractive index at 1550 nm is set forth in row 2 respectively. The change in refractive index n as a function of temperature β is set forth in rows 3. Row 7 sets forth the coefficient of thermal expansion a for the medium.

The selection of physical length of each optical components can be determined by solving Equation 4 and 5 together. For example, for cell 1100, $1^{st}$ coupler 1110, $2^{nd}$ coupler 1130 and spacer 1150 can be made of fused silica. The $1^{st}$ beam splitting surface of prism 1110 forms 35 degree angle with respect to bottom surface of the coupler. For a 100 GHz FSR and thermally compensated cell, L16=2.862 mm and its width is FIG. 2c is 3.014 mm. The spacer length L10=1.8475 mm. $2^{nd}$ coupler 1130 is identical to $1^{st}$ coupler 1110.

Figure 10A:
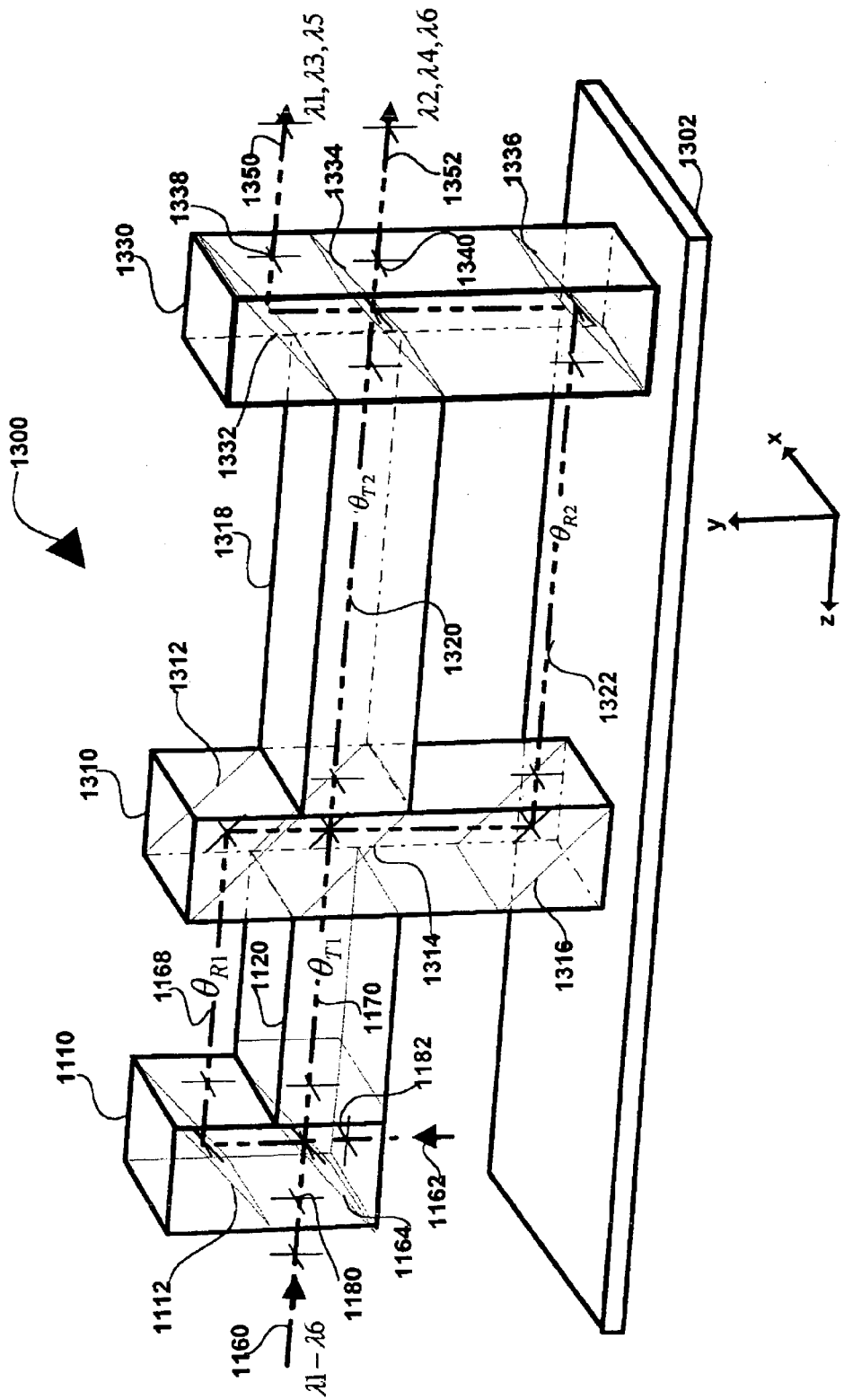
FIG. 10A is an isometric side view of an optical filter constructed from a series of delay paths coupled by intensity dependent beam splitters.

FIG. 10A is an isometric side view of an optical filter 1300 constructed from a series of delay paths coupled by intensity dependent beam splitters. Such a filter could be fabricated strictly by repetition of the cell structure shown in FIG. 8B. In this embodiment of the invention however, intermediate couplers are configured in a single coupling block with a pair of reflectors. Each intermediate coupling block couples an adjacent pair of delay paths.

Three coupler/reflector blocks 1110, 1310, 1330 are shown with a first delay path pair $\theta_{R1}$, $\theta_{T2}$ also referenced as 1168–1170 respectively and a second delay path pair $\theta_{R2}$, $\theta_{T2}$ also referenced as 1322, 1318 respectively, between them to form a sequence of delay paths. The sequence of delay paths allows, as discussed above, an optical filter to exhibit a more complex transfer function than the simple sinusoidal output provided by the single cell shown in FIG. 8B. The second pair of delay paths $\theta_{R2}$, $\theta_{T2}$ are shown with a delay difference larger than the first pair of delay paths. For purposes of example the physical dimension of the second pair of delay paths is larger than the first pair. If the indices of refraction of the optical elements of the second set of delay paths are increased the physical dimension required to generate the larger delay difference will decrease. The first delay path pair can establish by the difference between its delay paths the fundamental sinusoidal harmonic for the sequence with the second delay path pair providing higher order harmonics. The coefficients or amplitude of each harmonic are provided by varying the coupling ratio/percentage/coefficients between the reflection and transmission delay paths within each delay path pair. The coupling coefficients are varied by varying the reflection and transmission ratios for each intensity beam splitter 1164, 1314 and 1334 with the sequence.

The first coupler block includes intensity beam splitter 1164 and reflector 1112. The intensity beam splitter accepts input from either or both of beans 1160–1162 at the first and second ports 1180–1182 respectively. Optical element 1120 bridges the gap between coupler/reflector block 1110 and the next coupler/reflector block 1310 in the sequence. Coupler/reflector block 1310 includes intensity beam splitter 1314 and reflectors 1312, 1316. The intensity beam splitter couples the inputs/outputs from the first pair of delay paths $\theta_{R1}$, $\theta_{r1}$ to the output/inputs of the second delay path pair $\theta_{R2}$ $\theta_{T2}$. The reflectors 1312, 1316 handle the redirection of the delay paths $\theta_{R1}$, $\theta_{R2}$ respectively. Optical element 1320 bridges the gap between coupler/reflector block 1310 and the next coupler/reflector block 1330 in the sequence. Coupler/reflector block 1330 includes intensity beam splitter 1334 and reflectors 1332, 1336. The intensity beam splitter couples the inputs/outputs from the second pair of delay paths $\theta_{R2}$, $\theta_{T2}$ to the third and fourth ports 1338–1340. The reflector 1336 handles the redirection of the delay path $\theta_{R2}$. Each coupler reflector block may be fabricated from optical glass in the same manner discussed above in connection with FIG. 8B. The various components are shown on top of base 1302.

Optical beams 1160–1162 input at ports 1180–1182 respectively, traverse the sequence of delay paths to exit as two discrete optical beams 1350–1352 at ports 1338–1340 respectively. The basic structure shown here can be continued to form a longer sequence of cells and a more complex optical filter transfer function.

Figure 10B:
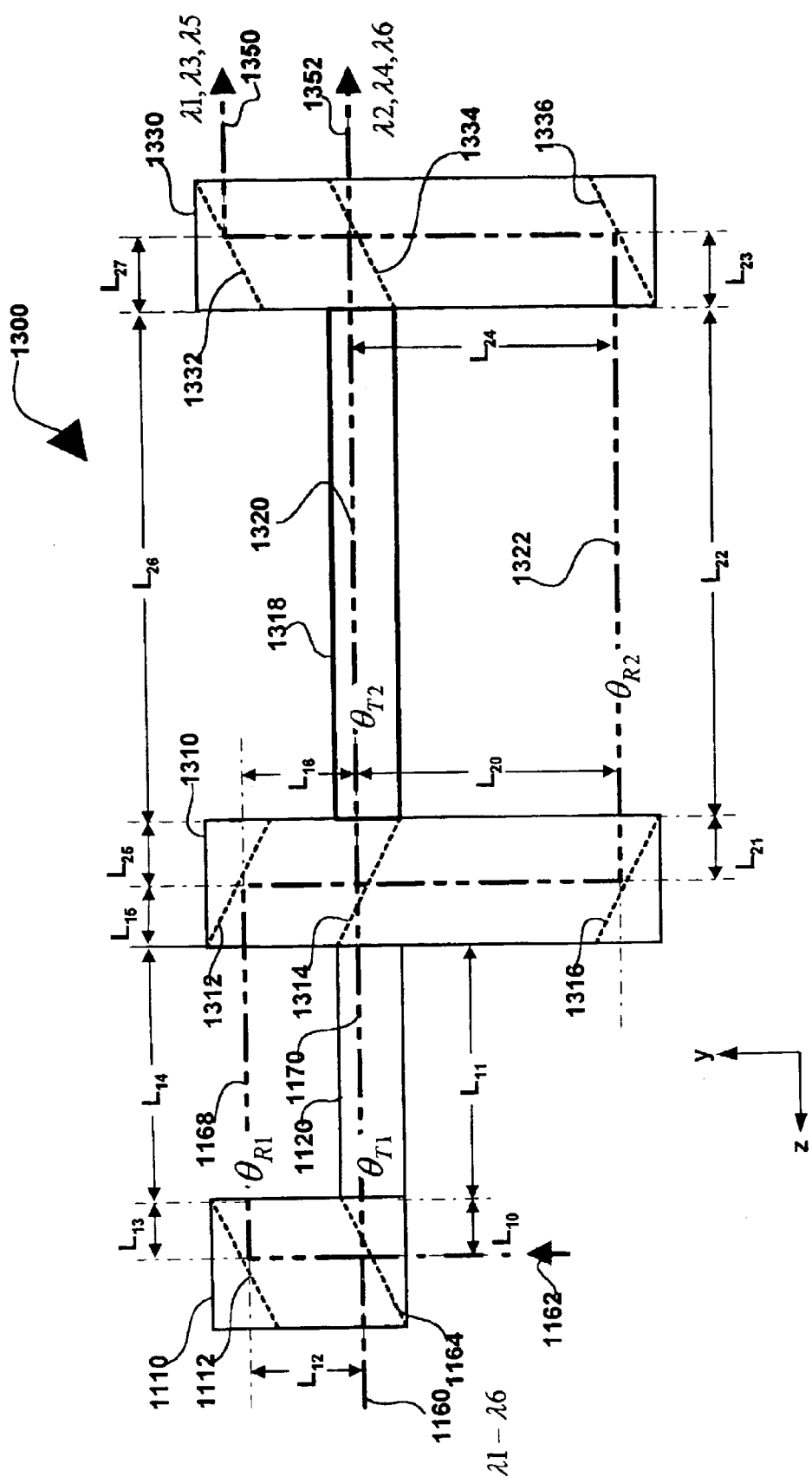
FIG. 10B is a side elevation view of the delay paths of the multi-cell implementation shown in FIG. 10A.

FIG. 10B is a side elevation view of the delay paths of the multi-cell implementation shown in FIG. 10A The delay introduced into light passing along any delay path is a function of the optical path length of the various optical elements on the delay path For purposes of the current invention optical elements include: a vacuum, a gas, a liquid, a solid or a plasma along the propagation path Beams 1160–1162 propagate through the first pair of delay paths $\theta_{R1}$ and $\theta_{T1}$ and the second pair of delay paths $\theta_{R2}$ and $\theta_{T2}$. Delay path $\theta_{T1}$ comprises optical elements defined by optical path length $L_{10}$–$L_{11}$ and $L_{15}$. Delay path $\theta_{R1}$ comprises optical elements defined by optical path lengths $L_{12}$–$L_{16}$. Delay path $\theta_{T2}$ comprises optical elements defined by optical path lengths $L_{25}$–$L_{27}$. Delay path $\theta_{R2}$ comprises optical elements defined by optical path lengths $L_{20}$–$L_{24}$. In the embodiment shown the optical elements defined by optical lengths $L_{14}$ and $L_{22}$ include air/gas/vacuum. The remaining optical elements may be fabricated from various types of optical glass including: BK7, fused silica, SF5. By proper design of delay paths the fundamental and higher order harmonics for the optical filter may be established.

The delay for the delay paths $\theta_{R1}$ and $\theta_{r1}$ are expressed as a function of the optical path lengths of each path as discussed above in equations Equations 4–5, with $\theta_{R1}$ substituted for $\theta_{S1}$ in Equation 4 and with $\theta_{r1}$, substituted for $\theta_{P1}$, respectively.

The delay difference between the two delay paths is calculated in the same manner as shown in Equation 6 above. The delay difference for the cell is proportional to the difference in the optical path lengths between the reflection (R) and transmission A) delay paths. Similar considerations apply in determining the delays and delay differences for the second pair of delay paths $\theta_{R2}$ and $\theta_{T2}$.

The optical path length difference between the two delay paths in a delay path pair corresponds inversely with the free spectral range (FSR) of the cell as evidenced in the pass bands and stop bands in the two output beams 1350–1352 from the cell. This relationship is set forth and discussed in Equation 7 above with $L_1$ and $L_1$ representing in this embodiment the total optical path length of the I and J elements which make up the corresponding delay paths $\theta_{R1}$, and $\theta_{R1}$. Now, for an optical mux/demux a condition to be satisfied is that the FSR be a constant perhaps equal to the channel spacing, e.g., 100 GHz Using Equation 7 the delay difference required to generate this result can be determined, and from it a solution to the optical path lengths for each of the delay paths.

FIG. 10C is a side elevation view of the variable coupling between cells of the multi cell implementation shown in FIG. 10A Coupling is used to control the amount an input of polarized light that will be projected onto the R and T delay paths. The coupling values for the intensity beam splitters 1164, 1314, and 1318 are $[R_1, T_1]$, $[R_2, T_2]$ and $[R_3, T_3]$ respectively.

FIG. 10D shows the individual transforms associated with each of the optical paths for input beam 1160 from the input port 1180 (See FIG. 10A) to the output port 1350. The number of discrete paths in a multi-cell sequence of N cells with two delay paths in each delay path pair, equals $2^N$ as discussed above in connection with FIGS. 9D–E. For the embodiment shown in FIGS. 10A–C with two pairs of delay paths there are $2^2$ or 4 discrete paths between any one of the two port serving as inputs and any one of the two output ports serving as output. Dealing with beam 1160 as an input at the first port 1180 (See FIG. 10A) and beam 1350 as an output at port 1338 (See FIG. 10A) there are 4 discrete delay paths from input to output. These paths are $\theta_{R1} > \theta_{R\ 2}$, $\theta_{R1} > \theta_{T2}$, $\theta_{T1} > \theta_{T2}$, and $\theta_{T1} > \theta_{R2}$. The transfer function for the optical filter in singe or sequential cell embodiments between any input and output port is the sum of the individual transfer functions associated with each discrete path from input to output. Transfer functions: 1388, 1390, 1392, 1394 are shown for the $1^{st}$ to $4^{th}$ paths discussed above. Each transfer function includes two terms 1396–1398. The first term 1396 corresponds to a coefficient in a Fourier series with the coefficient magnitude proportional to the product of the coupling or cross coupling coefficients along the particular path. The second term 1398 corresponds to the frequency component associated with that coefficient. The frequency component corresponds with the sum of the delays along a corresponding path This in turn corresponds with the optical path lengths along each path. The sum of all the transfer functions forms a truncated Fourier series which fully defines the optical filter.

Thermal stabilization of the delay pairs is effected in this embodiment of the invention in the same manner as discussed above in connection with Equation 8, for all the optical elements which make up each of the delay paths.

Figure 11:
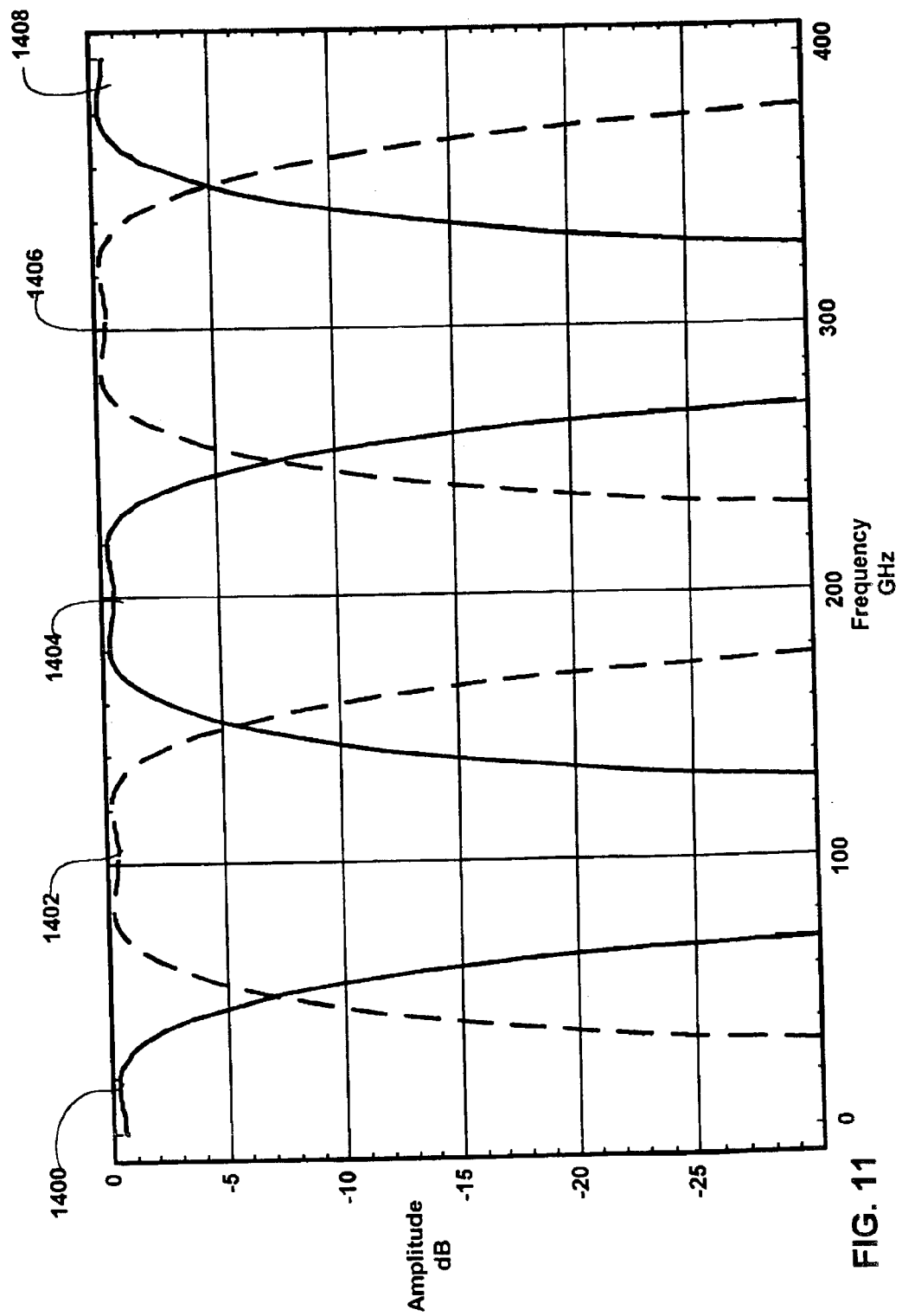
FIG. 11 is a graph showing the pass bards and stop bands associated with a specific filter transform which may be achieved using the optical filters of the current invention.

FIG. 11 is a graph showing the pass bands and stop bands associated with a specific filter transform which may be achieved using the optical filters of the current invention. In the example shown the envelope associated with six narrowly spaced, i.e., 100 GHz or 0.8 nm WDM channels. The odd channels 1400, 1404, 1408 are shown in solid line. The even channels 1402, 1406 are shown in dashed line. The precise center frequencies of each channel are specified by standard setting organizations such as the International Telecommunications Union (TU). These center frequencies are set forth as part of a wavelength grid which defines the center frequencies and spacing between channels. The pass bands exhibit flat tops which may be preferred because each channel is subject to shifting around the center frequency and a flat top avoids attenuation of a channel subject to such shifting. Shifting may be caused by any one of a number of factors including temperature, inter-channel interference and polarization mode dispersion. The fat top profile is achieved by the sequencing of optical filters as shown in either of FIG. 9A or 10A, to provide higher order harmonics.

In alternate embodiments of the invention the cells and serially coupled cells may be fabricated on a common semi-conductor substrate. The various components: reflectors, couplers, and optical elements may be fabricated using a combination of etching and deposition techniques well know in the semiconductor industry.

The foregoing description of preferred embodiments of the invention has been presented for purposes of illustration and description. It is not intended to be echaustive or to limit the invention to the precise forms disclosed: Obviously many modifications and variations wig be apparent to practitioners skilled in this art.

We claim:

1. A method for splitting or combining optical signals, comprising:

subjecting odd and even channel sets to a first set of phase retardations corresponding with odd integer multiples of half a wavelength for each center wavelength associated with a selected one of the odd channel set and the even channel set and corresponding with integer multiples of a full wavelength for each center wavelength associated with the other of the odd channel set and the even channel set; and subjecting the odd and even channel sets to a second set of phase retardations corresponding with integer multiples of a full wavelength for each center wavelength associated with the selected one of the odd channel set and the even channel set and corresponding with odd integer multiples of half a wavelength for each center wavelength associated with the other one of the odd channel set and the even channel set.

2. The method of claim 1, wherein subjecting the odd and even channel sets to a first set of phase retardations comprises:

filtering the selected one of the odd channel set and the even channel set with a first comb filer function; and filtering the other of the odd channel set and the even channel set with a second comb filter function distinct from the first comb filter function.

3. The method of claim 2, wherein subjecting the odd and even channel sets to a second set of phase retardations comprises:

filtering the selected one of the odd channel set and the even channel set with the second comb filter function; and filtering the other of the odd channel set and the even channel set with the first comb filter function to broaden stopbands between adjacent odd channels and between adjacent even channels.

4. The method of claim 3, wherein each of the filtering acts further comprises asymmetrically coupling the optical signals onto at least one pair of fast and slow delay paths to effect the broadening of the stopbands.

5. The method of claim 1, wherein subjecting the odd and even channel sets to a first set of phase retardations comprises:

filtering the selected one of the odd channel set and the even channel set with a first comb filter function that exhibits a primary periodicity corresponding to twice a spacing between adjacent channels; and filtering the other of the odd set of channels and the even set of channels with a second comb filter function that exhibits both the primary periodicity and a residual periodicity substantially equal to the primary periodicity and shifted in phase with respect thereto by $\pi$.

6. The method of claim 5, wherein subjecting the odd and even channel sets of a second set of phase retardations comprises:

filtering the selected one of the odd channel set and the even channel set with the second comb filter function; and filtering the other of the odd channel set and the even channel set with the first comb filter function to broaden stopbands between adjacent odd and adjacent even channels.

7. The method of claim 1, further comprising splitting the odd channel sets from the even channel sets after subjecting the odd and even channel sets to the first set of phase retardations and before subjecting the odd and even channel sets to the second set of phase retardations.

8. The method of claim 1, further comprising combining the odd channel sets with the even channel sets after subjecting the odd and even channel sets to the first set of phase retardations and before subjecting the odd and even channel sets to the second set of phase retardations.

9. The method of claim 1, further comprising:

receiving the odd channel set and the even channel set at a single input port before subjecting the odd and even channel sets to the first set of phase retardations; and outputting the odd channel set at a first output port after subjecting the odd and even channel sets to the second set of phase retardations; and outputting the even channel set at a second output port after subjecting the odd and even channel sets to the second set of phase retardations, such that the odd channel set has been split from the even channel set.

10. The method of claim 1, further comprising:

receiving the odd channel set at a first input port before subjecting the odd and even channel sets to the first set of phase retardations;

receiving the even channel set at a second input port before subjecting the odd and even channels sets to the second set of phase retardations; and outputting the odd channel set and the even channel set at a single output port after subjecting the odd and even channel sets to the second set of phase retardations, such that the odd channel set and the even channel set have been combined.

11. In a multiplexer that process optical signals, including an odd channel set and an even channel set, a method for combining the odd channel set and the even channel set, comprising:

receiving the odd channel set at a first input port of the multiplexer;

receiving the even channel set at a second input port of the multiplexer, subjecting the odd and even channel sets to a first set of phase retardations corresponding with odd integer multiples of half a wavelength for each center wavelength associated with a selected one of the odd channel set and the even channel set and corresponding with integer multiples of a full wavelength for each center wavelength associated with the other of the odd channel set and the even channel set;

combining the odd channel set and the even channel set;

subjecting the odd and even channel sets to a second set of phase retardations corresponding with integer multiples of a full wavelength for each center wavelength associated with the selected one of the odd channel set and the even channel set and corresponding with odd integer multiples of half a wavelength for each center wavelength associated with the other one of the odd channel set and the even channel set; and outputting the odd channel set and the even channel set at a single output port of the multiplexer.

12. The method of claim 1, wherein subjecting the odd and even channel sets to a first set of phase retardations comprises:

filtering the selected one of the odd channel set and the even channel set with a first comb filer function; and filtering the other of the odd channel set and the even channel set with a second comb filter function distinct from the first comb filter function.

13. The method of claim 12, wherein subjecting the odd and even channel sets to a second set of phase retardations comprises:

filtering the selected one of the odd channel set and the even channel set with the second comb filter function; and filtering the other of the odd channel set and the even channel set with the first comb filter function to broaden stopbands between adjacent odd channels and between adjacent even channels.

14. The method of claim 11, wherein subjecting the odd and even channel sets to a first set of phase retardations comprises:

filtering the selected one of the odd channel set and the even channel set with a first comb filter function that exhibits a primary periodicity corresponding to twice a spacing between adjacent channels; and filtering the other of the odd set of channels and the even set of channels with a second comb filter function that exhibits both the primary periodicity and a residual periodicity substantially equal to the primary periodicity and shifted in phase with respect thereto by $\pi$.

15. The method of claim 14, wherein subjecting the odd and even channel sets of a second set of phase retardations comprises:

filtering the selected one of the odd channel set and the even channel set with the second comb function; and filtering the other of the odd channel set and the even channel set with the first comb filter function to broaden stopbands between adjacent odd and adjacent even channels.

16. In a demultiplexer that process optical signals, including an odd channel set and an even channel set, a method for splitting the odd channel set from the even channel set, comprising:

receiving the odd channel set and the even channel set at a single input port of the demultiplexer;

subjecting the odd and even channel sets to a first set of phase retardations corresponding with odd integer multiples of half a wavelength for each center wavelength associated with a selected one of the odd channel set and the even channel set and corresponding with integer multiples of a full wavelength for each center wavelength associated with the other of the odd channel set and the even channel set;

splitting the odd channel set from the even channel set;

subjecting the odd and even channel sets to a second set of phase retardations corresponding with integer multiples of a full wavelength for each center wavelength associated with the selected one of the odd channel set and the even channel set and corresponding with odd integer multiples of half a wavelength for each center wavelength associated with the other one of the odd channel set and the even channel set; and outputting the odd channel set from a first output port of the demultiplexer; and outputting the even channel set from a second output port of the demultiplexer.

17. The method of claim 16 wherein subjecting the odd and even channel sets to a first set of phase retardations comprises:

filtering the selected one of the odd channel set and the even channel set with a first comb filer function; and filtering the other of the odd channel set and the even channel set with a second comb filter function distinct from the first comb filter function.

18. The method of claim 17, wherein subjecting the odd and even channel sets to a second set of phase retardations comprises:

filtering the selected one of the odd channel set and the even channel set with the second comb filter function; and filtering the other of the odd channel set and the even channel set with the first comb filter function to broaden stopbands between adjacent odd channels and between adjacent even channels.

19. The method of claim 16, wherein subjecting the odd and even channel sets to a first set of phase retardations comprises:

filtering the selected one of the odd channel set and the even channel set with a first comb filter function that exhibits a primary periodicity corresponding to twice a spacing between adjacent channels; and filtering the other of the odd set of channels and the even set of channels with a second comb filter function that exhibits both the primary periodicity and a residual periodicity substantially equal to the primary periodicity and shifted in phase with respect thereto by $\pi$.

20. The method of claim 19, wherein subjecting the odd and even channel sets of a second set of phase retardations comprises:

filtering the selected one of the odd channel set and the even channel set with the second comb filter function; and filtering the other of the odd channel set and the even channel set with the first comb filter function to broaden stopbands between adjacent odd and adjacent even channels.

* * * * *

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Cover Page,
Item (54), after "DIVISION" change "MULTIPLED" to --MULTIPLEXED--

Column 1,
Line 19, after "optical" change "filers" to --filters--
Line 31, change "different portion," to --different portions,--
Line 50, change "processes" to --process--
Line 57, change "Battening" to --flattening--

Column 2,
Line 20, before "dispersion" insert --the--
Line 21, change "filter" to --filters--
Line 21, after "OC-192" change "signal" to --signals--

Column 3,
Line 30, after "will become" change "ore" to --more--
Line 40, change "dispersions profiles" to --dispersion profiles--

Column 4,
Line 36, change "EMBODIMENT" to --EMBODIMENTS--
Line 44, after "mux/demux can" insert --,--

Column 5,
Line 30, after "delay path" change "with" to --within--
Line 53-54, change "Others of the cells," to --Other cells,--
Line 54, after "harmonic cell(s)" insert --,--
Line 60, after "of the cells" insert --,--
Line 63, change "GHzThe" to --GHz. The--
Line 64, after "paths in a filter" remove ","

Column 6,
Line 5, change "$L_I$ and $L_I$" to --$L_I$ and $L_J$--
Line 6, after "substage" insert --,--
Line 7, after "cells" remove ","
Line 9, after "cell" insert --,--
Line 40, change "theft" to --the first--
Line 42, after "dispersion" change "in" to --within--
Line 43, after "signal integrity" insert --within--
Line 49, change "FIGS. 2A-8" to --FIGS. 2A-B--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 7,
Line 2, change "Cb 9-Ch 13," to --Ch 9-Ch 13,--
Line 3, after "the vertical" change "was" to --axis--
Line 37, change "380° to 720°" to --360° to 720°--
Line 45, after "even channels" change "experience" to --experiencing--
Line 53, after "retardations of" remove "the"

Column 8,
Line 6, after "flat line response" insert --,--
Line 7, change "stop bends" to --stop bands--
Line 10, change "sign diagrams" to --signal diagrams--
Line 14, change "fist and slow pats" to --fast and slow paths--
Line 22, after "in this example" insert --,--
Line 54, after "in this example" insert --,--

Column 9,
Line 25, change "Supposed" to --Superimposed--
Line 58, before "port 136" change "renaming" to --remaining--

Column 10,
Line 9, after "Path 516 would" remove "in"
Line 34, before "cell 570." change "with" to --within--
Line 41, after "The couplers" remove "may"
Line 51, change "sub-stages" to --sub-stage's--
Line 58, after "stopbands" remove "of"
Line 65, change "do-interleaved" to --de-interleaved--

Column 11,
Line 10, after "couple would" remove "of"
Line 37, before "be fabricated" change "ma" to --may--
Line 38, after "dielectric" change "coat" to --coatings--
Line 42, change "filters 630 and 66." to --filters 630 and 660.--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 12,
Line 4, change "fist path," to --fast path,--
Line 21, after "Where the cell" change "if" to --is--
Line 30, change "two filter calls," to --two filters cells,--
Line 30, change "serial coupled" to --serially coupled--
Line 31, between "Each" and "serially" insert the following missing line:
 --cell includes a pair of delay paths. Filter 660 also includes two
 filter cells 670, 680--
Line 35, change "Del" to --Delay--
Line 54, change "sub-stages" to --sub-stage's--
Line 61, after "stopbands" remove "of"

Column 13,
Line 8, after "half waveplate" insert --,--
Line 10, after "polarization vector" remove ","
Line 13, after "amount 2Φ" insert --,--
Line 16, after "full waveplate" insert --,--
Line 17, change "polarized fight" to --polarized light--
Line 19, after "polarization vector" remove ","
Line 22, after "FIGS. 7A-D" insert --,--
Line 62, after "The linearly" change "polar" to --polarized--

Column 14,
Line 15, before "by waveplates" change "polarized" to --linearized--
Line 25, before "the incident wavelength." remove "A"
Line 28, change "optical bean" to --optical beam--
Line 63, change "Light transit" to --Light transmitted--

Column 15,
Line 4, change "realigns" to --re-aligns--
Line 15, change "beam splitter 134" to --beam splitter 1134--
Line 21, after "beam splitter" change "are" to --is--
Line 23, change "fist coupler" to --first coupler--
Line 24, change "corresponded" to --correspond--
Line 35, after "two pairs of" change "prism." to --prisms.--
Line 35, change "block 110" to --block 1110--
Line 36, change "beam splitter 114" to --beam splitter 1114--
Line 50, change "exterior surfs" to --exterior surfaces--
Line 54, change "second block 130." to --second block 1130.--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 16,
Line 35, change "vectors 156-1158." to --vectors 1156-1158.--
Line 37, after "center wavelengths" insert --,--
Line 62, change "reflectors 1112 and 1130" to --reflectors 1112 and 1132--

Column 17,
Line 12, change "within an." to --within an--
Line 48, change "The cell 1102" to --The cell 1106--
Line 67, before "either delay path" remove "the"

Column 18,
Line 10, change "$\theta_{r1}$ and $\theta_{R1}$" to -- $\theta_{T1}$ and $\theta_{R1}$--
Line 40, change "component" to --components--
Line 41, before "a net change" insert --in--
Line 50, change "is shown is cleaved" to --is shown cleaved--

Column 19,
Line 28, change "are rennin" to --are realized--
Line 43, change "cell 100" to --cell 1100--
Line 46, change "cell 100" to --cell 1100--

Column 20,
Line 9, change "polarization axis" to --polarization axes--
Line 27, after "delay paths" insert --,--
Line 38, change "pa length" to --path length--
Line 42, after "refraction "n"" insert --of--
Line 46, after "a vacuum" insert --,--
Line 62, change "$L_{12}$-$L_{22}$" to --$L_{12}$ and $L_{22}$--

Column 21,
Line 3, change "follow" to --following--
Line 37, change "optical p length" to --optical path length--
Line 49, change "$L_I$ and $L_I$" to -- $L_1$ and $L_J$--
Line 49, change "path length" to --path lengths--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 22,
Line 10, change "the bean" to --the beam--
Line 19, change "angle $\Phi_1$" to -- angle $\Phi_2$--
Line 21, change "shows the" to --shows both the--
Line 22, change "vectors, $P_2$, $S_2$" to --vectors $P_2$, $S_2$--
Line 34, change "$2^1$ or 4" to --$2^2$ or 4--
Line 36, change "the fit cell" to --the first cell--
Line 45, change "$1^{st}$ to 4 th paths" to --$1^{st}$ to $4^{th}$ paths--
Line 61, change "optical stream" to --optical streams--
Line 63, change "optical stream" to --optical streams--
Line 65, change "can substantially" to --can be substantially--
Line 66, change "45 degree" to --45 degrees--
Line 67, change "(45+22.5) degree." to --(45 + 22.5) degrees.--

Column 23,
Line 1, change "and a cell" to --and a $2^{nd}$ cell--
Line 21, change "C.R. Henry" to --C.H. Henry--
Line 29, change "Passive Thernal" to --Passive Thermal--
Line 32, change "mux/demux" to --mux/demux.--
Line 59, change "across a rage" to --across a range--

Column 24,
Line 9, change "dosed loop" to --closed loop--
Line 10, change "any increase" to --may increase--
Line 14, change "which nuke" to --which make--
Line 34, change "p," to --paths,--
Line 56, change "$a_i$ and $a_4$" to --$\alpha_i$ and $\alpha_j$--
Line 58, change "respective" to --respectively--

Column 25,
Line 15, change "Row 7" to --Row 4--
Line 16, change "thermal expansion a" to --thermal expansion $\alpha$--

Column 28,
Line 6, change "fat top profile" to --flat top profile--
Line 7, change "FIG." to --FIGS.--
Line 14, change "well know" to --well known--
Line 17, change "echausive" to --exhaustive--
Line 18, change "disclosed:" to --disclosed.--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 29,
Line 51, change "process optical signals," to --processes optical signals,--

Column 30,
Line 53, change "process optical signals" to --processes optical signals,--

Column 31,
Line 19, change "comb filer function;" to --comb filter function;--

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,845,191 B1 |
| APPLICATION NO. | : 10/661991 |
| DATED | : January 18, 2005 |
| INVENTOR(S) | : Xie et al. |

It is certified that error appears in the above-identified patent and that said Letters Patent is hereby corrected as shown below:

Cover Page,
Item (54), after "DIVISION" change "MULTIPLED" to --MULTIPLEXED--

Column 1,
Line 19, after "optical" change "filers" to --filters--
Line 31, change "different portion," to --different portions,--
Line 50, change "processes" to --process--
Line 57, change "Battening" to --flattening--

Column 2,
Line 20, before "dispersion" insert --the--
Line 21, change "filter" to --filters--
Line 21, after "OC-192" change "signal" to --signals--

Column 3,
Line 30, after "will become" change "ore" to --more--
Line 40, change "dispersions profiles" to --dispersion profiles--

Column 4,
Line 36, change "EMBODIMENT" to --EMBODIMENTS--
Line 44, after "mux/demux can" insert --,--

Column 5,
Line 30, after "delay path" change "with" to --within--
Line 53-54, change "Others of the cells," to --Other cells,--
Line 54, after "harmonic cell(s)" insert --,--
Line 60, after "of the cells" insert --,--
Line 63, change "GHzThe" to --GHz. The--
Line 64, after "paths in a filter" remove ","

Column 6,
Line 5, change "$L_I$ and $L_I$" to --$L_I$ and $L_J$--
Line 6, after "substage" insert --,--
Line 7, after "cells" remove ","
Line 9, after "cell" insert --,--
Line 40, change "theft" to --the first--
Line 42, after "dispersion" change "in" to --within--
Line 43, after "signal integrity" insert --within--
Line 49, change "FIGS. 2A-8" to --FIGS. 2A-B--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 7,
Line 2, change "Cb 9-Ch 13," to --Ch 9-Ch 13,--
Line 3, after "the vertical" change "was" to --axis--
Line 37, change "380° to 720°" to --360° to 720°--
Line 45, after "even channels" change "experience" to --experiencing--
Line 53, after "retardations of" remove "the"

Column 8,
Line 6, after "flat line response" insert --,--
Line 7, change "stop bends" to --stop bands--
Line 10, change "sign diagrams" to --signal diagrams--
Line 14, change "fist and slow pats" to --fast and slow paths--
Line 22, after "in this example" insert --,--
Line 54, after "in this example" insert --,--

Column 9,
Line 25, change "Supposed" to --Superimposed--
Line 58, before "port 136" change "renaming" to --remaining--

Column 10,
Line 9, after "Path 516 would" remove "in"
Line 34, before "cell 570." change "with" to --within--
Line 41, after "The couplers" remove "may"
Line 51, change "sub-stages" to --sub-stage's--
Line 58, after "stopbands" remove "of"
Line 65, change "do-interleaved" to --de-interleaved--

Column 11,
Line 10, after "couple would" remove "of"
Line 37, before "be fabricated" change "ma" to --may--
Line 38, after "dielectric" change "coat" to --coatings--
Line 42, change "filters 630 and 66." to --filters 630 and 660.--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 12,
Line 4, change "fist path," to --fast path,--
Line 21, after "Where the cell" change "if" to --is--
Line 30, change "two filter calls," to --two filters cells,--
Line 30, change "serial coupled" to --serially coupled--
Line 31, between "Each" and "serially" insert the following missing line:
    --cell includes a pair of delay paths. Filter 660 also includes two
    filter cells 670, 680--
Line 35, change "Del" to --Delay--
Line 54, change "sub-stages" to --sub-stage's--
Line 61, after "stopbands" remove "of"

Column 13,
Line 8, after "half waveplate" insert --,--
Line 10, after "polarization vector" remove ","
Line 13, after "amount 2Φ" insert --,--
Line 16, after "fulll waveplate" insert --,--
Line 17, change "polarized fight" to --polarized light--
Line 19, after "polarization vector" remove ","
Line 22, after "FIGS. 7A-D" insert --,--
Line 62, after "The linearly" change "polar" to --polarized--

Column 14,
Line 15, before "by waveplates" change "polarized" to --linearized--
Line 25, before "the incident wavelength." remove "A"
Line 28, change "optical bean" to --optical beam--
Line 63, change "Light transit" to --Light transmitted--

Column 15,
Line 4, change "realigns" to --re-aligns--
Line 15, change "beam splitter 134" to --beam splitter 1134--
Line 21, after "beam splitter" change "are" to --is--
Line 23, change "fist coupler" to --first coupler--
Line 24, change "corresponded" to --correspond--
Line 35, after "two pairs of" change "prism." to --prisms.--
Line 35, change "block 110" to --block 1110--
Line 36, change "beam splitter 114" to --beam splitter 1114--
Line 50, change "exterior surfs" to --exterior surfaces--
Line 54, change "second block 130." to --second block 1130.--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 16,
Line 35, change "vectors 156-1158." to --vectors 1156-1158.--
Line 37, after "center wavelengths" insert --,--
Line 62, change "reflectors 1112 and 1130" to --reflectors 1112 and 1132--

Column 17,
Line 12, change "within an." to --within an--
Line 48, change "The cell 1102" to --The cell 1106--
Line 67, before "either delay path" remove "the"

Column 18,
Line 10, change "$\theta_{r1}$ and $\theta_{R1}$" to -- $\theta_{T1}$ and $\theta_{R1}$ --
Line 40, change "component" to --components--
Line 41, before "a net change" insert --in--
Line 50, change "is shown is cleaved" to --is shown cleaved--

Column 19,
Line 28, change "are rennin" to --are realized--
Line 43, change "cell 100" to --cell 1100--
Line 46, change "cell 100" to --cell 1100--

Column 20,
Line 9, change "polarization axis" to --polarization axes--
Line 27, after "delay paths" insert --,--
Line 38, change "pa length" to --path length--
Line 42, after "refraction "n"" insert --of--
Line 46, after "a vacuum" insert --,--
Line 62, change "$L_{12}$-$L_{22}$" to --$L_{12}$ and $L_{22}$--

Column 21,
Line 3, change "follow" to --following--
Line 37, change "optical p length" to --optical path length--
Line 49, change "$L_I$ and $L_I$" to -- $L_1$ and $L_J$--
Line 49, change "path length" to --path lengths--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 22,
Line 10, change "the bean" to --the beam--
Line 19, change "angle $\Phi_1$" to -- angle $\Phi_2$--
Line 21, change "shows the" to --shows both the--
Line 22, change "vectors, $P_2$, $S_2$" to --vectors $P_2$, $S_2$--
Line 34, change "$2^1$ or 4" to --$2^2$ or 4--
Line 36, change "the fit cell" to --the first cell--
Line 45, change "$1^{st}$ to 4 th paths" to --$1^{st}$ to $4^{th}$ paths--
Line 61, change "optical stream" to --optical streams--
Line 63, change "optical stream" to --optical streams--
Line 65, change "can substantially" to --can be substantially--
Line 66, change "45 degree" to --45 degrees--
Line 67, change "(45+22.5) degree." to --(45 + 22.5) degrees.--

Column 23,
Line 1, change "and a cell" to --and a 2 cell--
Line 21, change "C.R. Henry" to --C.H. Henry--
Line 29, change "Passive Thernal" to --Passive Thermal--
Line 32, change "mux/demux" to --mux/demux.--
Line 59, change "across a rage" to --across a range--

Column 24,
Line 9, change "dosed loop" to --closed loop--
Line 10, change "any increase" to --may increase--
Line 14, change "which nuke" to --which make--
Line 34, change "p," to --paths,--
Line 56, change "$a_i$ and $a_4$" to --$\alpha_i$ and $\alpha_j$--
Line 58, change "respective" to --respectively--

Column 25,
Line 15, change "Row 7" to --Row 4--
Line 16, change "thermal expansion a" to --thermal expansion $\alpha$--
Lines 18-19, change "components" to --component--
Line 22, change "forms 35 degree" to --forms a 35 degree--
Line 23, change "to bottom surface" to --the bottom surface--
Line 25, change "width is" to --width in--
Line 49, after "are increased" insert --,--
Line 60, change "with the sequence." to --within the sequence.--
Line 63, change "beans 1160-1162" to --beams 1160-1162--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 26,
Line 15, after "pair $\theta_{R2}$" insert --,--
Line 29, after "beams 1160-1162" insert --,--
Line 36, change "FIG. 10A" to --FIG. 10A.--
Line 39, change "delay path" to --delay path.--
Line 41, change "propagation path" to --propagation path.--
Line 56, change "$\theta_{R1}$ and $\theta_{r1}$" to --$\theta_{R1}$ and $\theta_{T1}$--
Line 58, before "Equations 4-5," remove "equations"
Line 59, change "and with $\theta_{r1}$," to --and with $\theta_{T1}$,--
Line 65, change "transmission A)" to --transmission (T)--

Column 27,
Line 6, change "$L_1$ and $L_1$" to --$L_1$ and $L_J$--
Line 8, after "paths $\theta_{R1}$" remove ","
Line 9, change "and $\theta_{R1}$." to --and $\theta_{T1}$.--
Line 11, after "100 GHz" insert --.--
Line 17, after "FIG. 10A" insert --.--
Line 18, after "polarized light" remove "that"
Line 34, change "$\theta_{R1}$>$\theta_{R2}$ ," to -- $\theta_{R1}$>$\theta_{R2}$,--
Line 48, after "corresponding path" insert --.--
Line 57, after "filter transform" insert --.--
Line 59, after "the example" insert --is--

Column 28,
Line 6, change "fat top profile" to --flat top profile--
Line 7, change "FIG." to --FIGS.--
Line 14, change "well know" to --well known--
Line 17, change "echausive" to --exhaustive--
Line 18, change "disclosed:" to --disclosed.--

Column 29,
Line 51, change "process optical signals," to --processes optical signals,--

Column 30,
Line 53, change "process optical signals" to --processes optical signals,--

UNITED STATES PATENT AND TRADEMARK OFFICE
CERTIFICATE OF CORRECTION

PATENT NO. : 6,845,191 B1
APPLICATION NO. : 10/661991
DATED : January 18, 2005
INVENTOR(S) : Xie et al.

It is certified that error appears in the above-identified patent and that said Letters Patent is hereby corrected as shown below:

Column 31,
Line 19, change "comb filer function;" to --comb filter function;--

This certificate supersedes Certificate of Correction issued December 5, 2006.

Signed and Sealed this

Seventh Day of August, 2007

JON W. DUDAS
*Director of the United States Patent and Trademark Office*